United States Patent
Ota et al.

(10) Patent No.: US 7,169,476 B2
(45) Date of Patent: Jan. 30, 2007

(54) ZINC OXIDE-ALUMINA-SILICA-BASED CRYSTALLIZED GLASS

(75) Inventors: Takashi Ota, Kazugai (JP); Kazuki Ootou, Kasugai (JP)

(73) Assignees: NGK Insulators, Ltd., Nagoya (JP); NGK Optoceramics Co., Ltd., Komaki (JP)

( * ) Notice: Subject to any disclaimer, the term of this patent is extended or adjusted under 35 U.S.C. 154(b) by 0 days.

(21) Appl. No.: 11/150,906

(22) Filed: Jun. 13, 2005

(65) Prior Publication Data

US 2005/0255984 A1    Nov. 17, 2005

Related U.S. Application Data

(63) Continuation of application No. PCT/JP2004/013670, filed on Sep. 17, 2004.

(30) Foreign Application Priority Data

Sep. 19, 2003  (JP) .............. 2003-328537
Oct. 17, 2003  (JP) .............. 2003-357975

(51) Int. Cl.
*B32B 17/06* (2006.01)
*C03C 3/076* (2006.01)
*C03C 3/078* (2006.01)
*C03C 10/14* (2006.01)

(52) U.S. Cl. .............. 428/433; 428/434; 501/4; 501/7; 501/55; 501/68; 501/69; 501/72

(58) Field of Classification Search .............. 428/433, 428/434; 501/4, 7, 55, 68, 69, 72
See application file for complete search history.

(56) References Cited

U.S. PATENT DOCUMENTS 3,681,097 A     8/1972  Beall et al.
3,854,963 A  *  12/1974  Rittler .............. 501/4

FOREIGN PATENT DOCUMENTS

| JP | 47-4979 A1 | 3/1972 |
| JP | 7-92527 B2 | 10/1995 |
| JP | 10-095641 A1 | 4/1998 |
| JP | 2002-109923 A1 | 4/2002 |
| JP | 2003-051210 A1 | 2/2003 |

* cited by examiner

*Primary Examiner*—Jennifer C McNeil
*Assistant Examiner*—G. Blackwell
(74) *Attorney, Agent, or Firm*—Burr & Brown

(57) ABSTRACT

A zinc oxide-alumina-silica-based crystallized glass is provided, containing zinc oxide, alumina and silica as main components, and zirconia as a nucleating agent. The main components are provided in a ratio of 20–30% by mass of zinc oxide, 15–25% by mass of alumina and 50–60% by mass of silica to amount to 100% by mass in total. The nucleating agent is contained in an amount of 3–6 parts by mass based on 100 parts by mass of the main components. The crystallized glass also includes at least one modification component selected from the group consisting of lithium oxide, sodium oxide, potassium oxide, diphosphorus pentoxide, niobium oxide and tantalum oxide in addition to the main components and the nucleating agent.

9 Claims, 6 Drawing Sheets

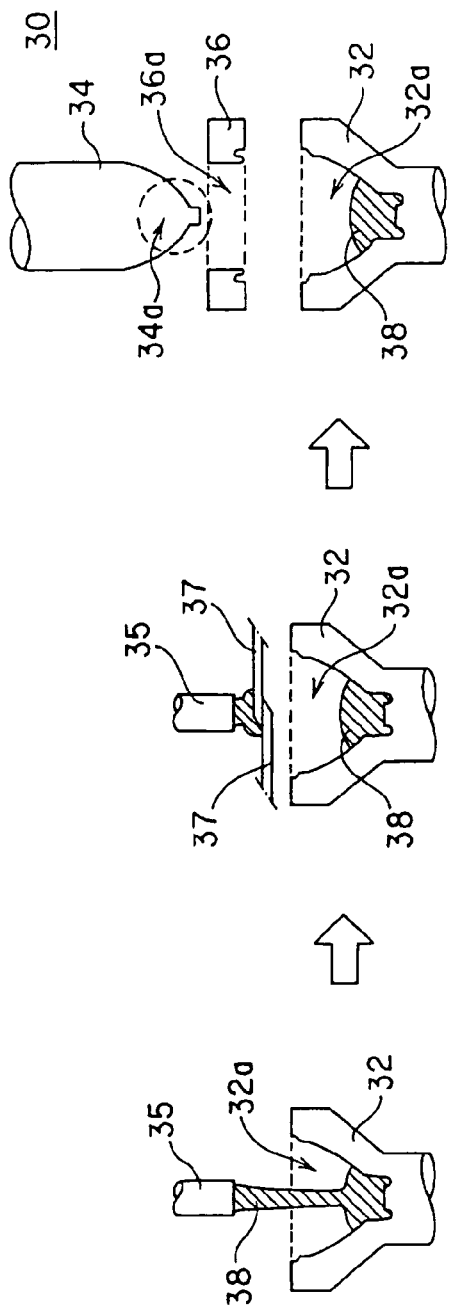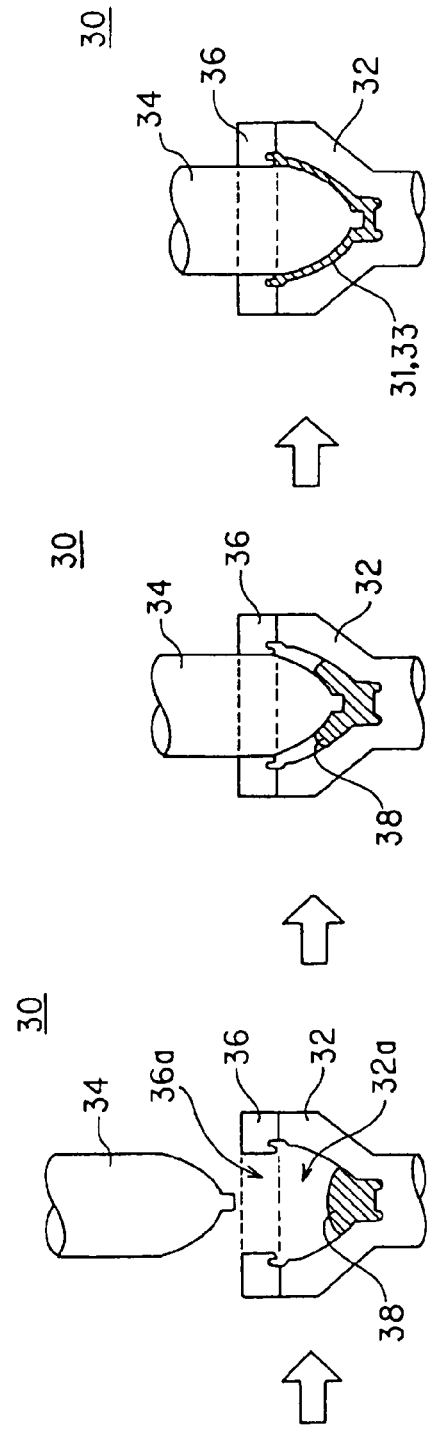

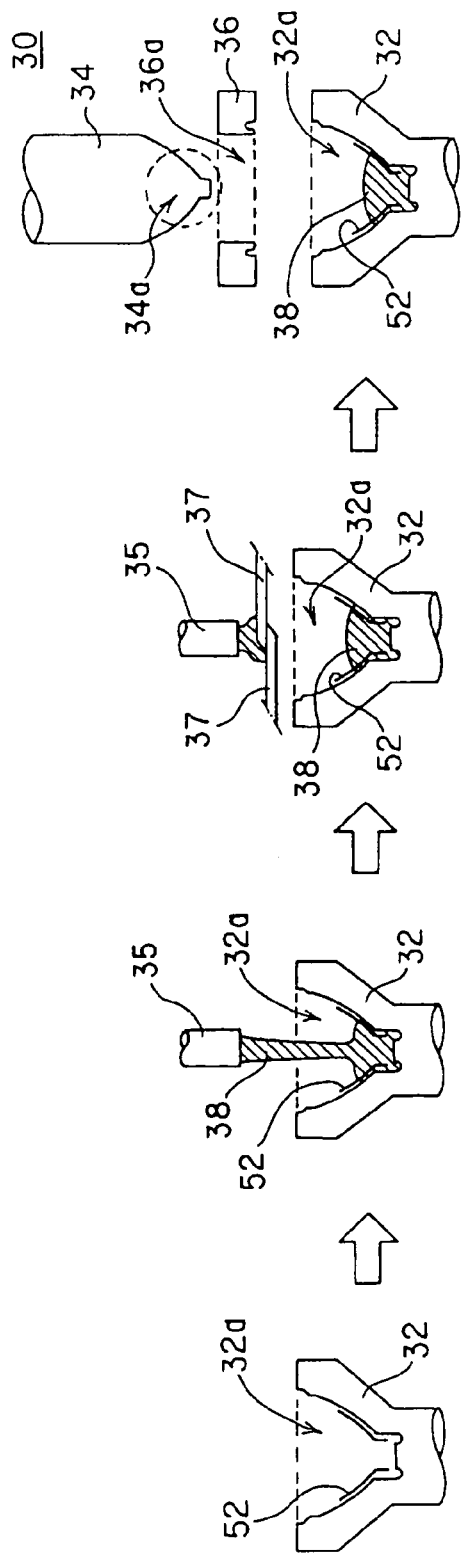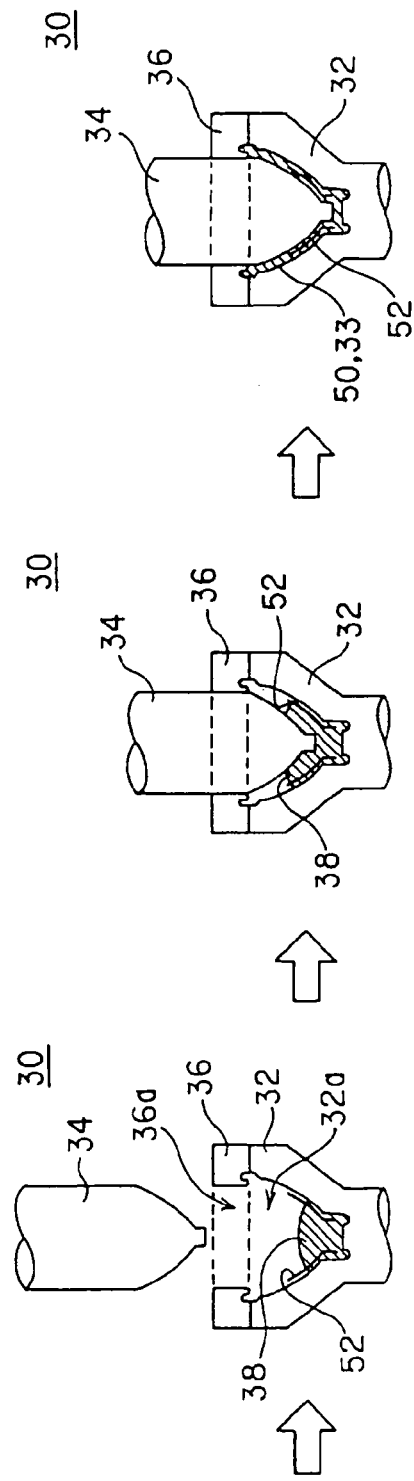

ZINC OXIDE-ALUMINA-SILICA-BASED CRYSTALLIZED GLASS

CROSS REFERENCE TO RELATED APPLICATIONS

This application is a continuation of International Application No. PCT/JP2004/013670 having an international filing date of Sep. 17, 2004, which designated the United States, the entirety of which is incorporated herein by reference.

This application claims the benefit of Japanese Application 2003-328537 filed Sep. 19, 2003, and Japanese Application 2003-357975 filed Oct. 17, 2003, the entireties of which are incorporated herein by reference.

TECHNICAL FIELD

The present invention relates to a crystallized glass suitable for use as a substrate for reflectors (reflector substrate) for reflecting light from a light source lamp, and in particular, as a reflector substrate for illuminators or projector light sources.

BACKGROUND ART

In the light sources of projectors such as OHP (over head projectors) and liquid crystal projectors and in illuminators such as those used for spot illumination, reflectors are used for reflecting light that is emitted from light source lamps. The reflectors are members that are exposed to high temperatures resulting from the generation of heat by light source lamps such as ultra-high pressure mercury lamps, and are required to have a high heat resistance. Therefore, hitherto, reflectors have been used which comprise a reflector substrate composed of a heat-resisting glass having excellent heat resistance (e.g., PYREX (trademark) manufactured by Corning Glass Works) and having a reflective film formed on the substrate.

However, recently, the output and luminance of the light source lamps used for illuminators and projector light sources tend to be increased, and the level of heat resistance that is required is further enhanced. Under the circumstances, crystallized glasses that are superior to heat-resisting glasses in heat resistance are proposed as materials constituting reflector substrates.

For example, it has been proposed to use lithia-alumina-silica-based crystallized glasses (hereinafter sometimes referred to as "lithia-based crystallized glasses") such as β-spodumene solid solution (β-spodumene: $Li_2O$—$Al_2O_3$-$4SiO_2$) and β-eucryptite solid solution (β-eucryptite: $Li_2O$—$Al_2O_3$-$2SiO_2$) (see, for example, JP-B-7-92527). Moreover, the inventors have also proposed using baria-alumina-silica-based crystallized glasses (hereinafter sometimes referred to as "baria-based crystallized glasses") such as celsian (BaO—$Al_2O_3$-$2SiO_2$) (see, for example, JP-A-2002-109923).

However, the lithia-based crystallized glass has such a problem in that it has a very small thermal expansion coefficient (JIS R1618: 40–400° C.) of about $0 \times 10^{-7}$–$20 \times 10^{-7}$ (/° C.) and shows excellent heat resistance, but is inferior in meltability because of its high melting point of about 1500° C. or higher. Specifically, there are difficulties in that special equipment (such as a melting furnace) which can stand temperatures higher than 1500° C. are required for melting the glass and molding the glass to make the substrate for the reflector, which restricts the production conditions.

On the other hand, the above-mentioned baria-based crystallized glass has a low melting point, namely, about 1450° C. and has no such high temperature production condition problems, but the thermal expansion coefficient (JIS R1618: 40—400° C.) is about $30 \times 10^{-7}$–$45 \times 10^{-7}$ (/° C.), and further improvement is needed in the aspect of heat resistance.

SUMMARY OF THE INVENTION

The present invention has been made in order to solve the conventional technical problems and provides a crystallized glass which has a composition that is different from the above conventional crystallized glasses and has a higher efficiency, specifically a high heat resistance that is at least equivalent to that of baria-based crystallized glasses, preferably has excellent heat resistance equivalent to that of lithia-based crystallized glasses, has a low melting point like the baria-based glasses to provide good meltability.

As a result of intensive research conducted by the inventors, it has been found that the above object can be attained by including a specific modification component in a zinc oxide-alumina-silica-based crystallized glass, and the present invention has been accomplished. According to a first embodiment of the present invention, a zinc oxide-alumina-silica-based crystallized glass is provided, including zinc oxide (ZnO), alumina ($Al_2O_3$) and silica ($SiO_2$) as main components, and zirconia ($ZrO_2$) as a nucleating agent, wherein the main components comprise 20–30% by mass of zinc oxide, 15–25% by mass of alumina and 50–60% by mass of silica and the main components amount to 100% by mass in total. The nucleating agent is contained in an amount of 3–6 parts by mass based on 100 parts by mass of the main components. The composition also includes at least one component selected from the group consisting of lithium oxide ($Li_2O$), sodium oxide ($Na_2O$), potassium oxide ($K_2O$), diphosphorus pentoxide ($P_2O_5$), niobium oxide ($Nb_2O_5$) and tantalum oxide ($Ta_2O_5$) as a modification component.

According to one aspect of the present invention, a crystalline phase is constituted of the main components and the main crystalline phase is a zinc petallite (Zn-petallite) solid solution or a β-quartz solid solution.

According to another aspect of the present invention, the modification component is included in an amount of 0.2–5.0 parts by mass based on 100 parts by mass of the main components.

According to yet another aspect of the present invention, tin dioxide is contained in place of apart of zirconia as the nucleating agent, and the content of tin dioxide is 0.5–4 parts by mass based on 100 parts by mass of the main components.

According to a second embodiment of the present invention, a reflector substrate is provided, which comprises a zinc oxide-alumina-silica-based crystallized glass according to any of the above-described aspects of the first embodiment and which has a main body having a concave for disposing a reflective film thereon and a metallic reticulate body embedded in the main body.

According to one aspect of the second embodiment of the present invention, the reticulate body comprises a metal mainly composed of at least one metal selected from the group consisting of nickel (Ni), cobalt (Co), stainless steel (SUS: Steel Use Stainless) and kobar.

According to a second aspect of the second embodiment of the present invention, the reticulate body comprises a metal mainly composed of at least one metal selected from the group consisting of gold (Au), platinum (Pt), silver (Ag) and copper (Cu) or has a surface film comprising the above metal.

The zinc oxide-alumina-silica-based crystallized glass (hereinafter sometimes referred to as "zinc oxide-based crystallized glass") has a high heat resistance that is at least equivalent to that of baria-based crystallized glasses, an excellent heat resistance that is equivalent to that of lithia-based crystallized glasses depending on the conditions, and has a low melting point to provide good meltability like the baria-based glasses. Furthermore, it has superior crystal stability with a lapse of time under high temperature conditions compared to lithia-based crystallized glasses and exhibits an extremely small volumetric contraction even after being exposed to high temperatures for a long time.

BRIEF DESCRIPTION OF THE DRAWINGS

FIG. 5 is a flow diagram which shows steps (a)–(f) of molding a reflector substrate using a reflector substrate molding mold.

FIG. 8 is a flow diagram which shows steps (a)–(g) of molding the reflector substrate of the present invention by a reflector substrate molding mold.

DESCRIPTION OF REFERENCE NUMERALS

Figure 1:
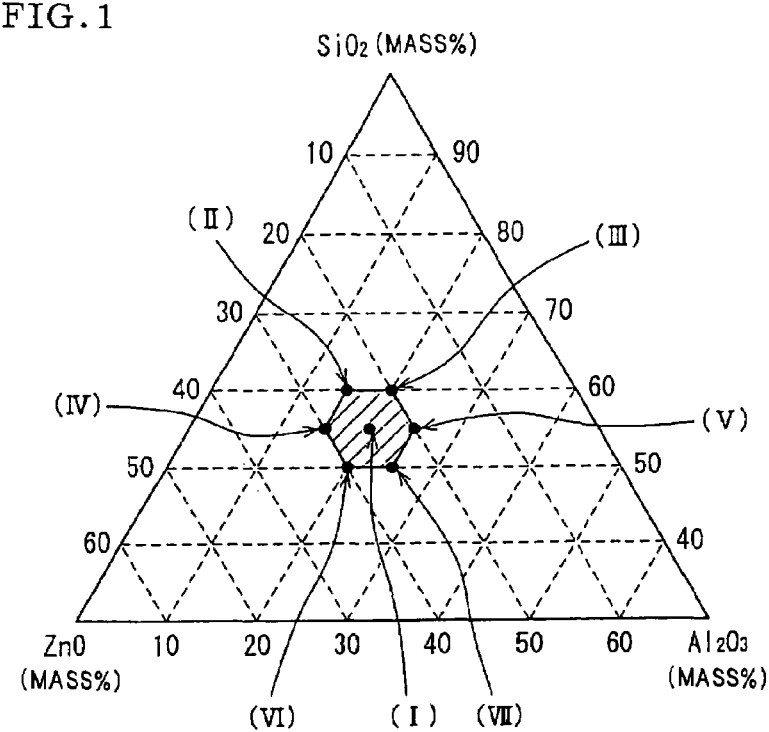
FIG. 1 is a phase diagram which shows a preferred constitutional ratio of the main components in the zinc oxide-alumina-silica-based crystallized glass of the present invention.

The reference numerals shown in the drawings correspond to the features of the present invention as follows:
10, 50—reflector substrate;
12—concave;
14—bowl-shaped portion;
15—constricted portion;
16—neck portion;
17—main body;
18—inner space;
20—through hole;
22—reflective film;
24—light source lamp;
26—fixing material;
28—protective plate;
30—reflector substrate molding mold;
32—mold;
32a—concave portion;
33—cavity;
34—core rod;
34a—convex portion;
35—gob feeding nozzle;
36—ring;
36a—guide hole;
38—gob;
37—cutting blade; and
52—reticulate body.

DETAILED DESCRIPTION OF THE INVENTION

The best mode for carrying out the crystallized glass of the present invention will be specifically explained below, which should not be construed as limiting the invention in any manner.

The crystallized glass of the present invention is a zinc oxide-based crystallized glass containing zinc oxide, alumina and silica as main components, and zirconia as a nucleating agent, wherein the constitutional ratio of zinc oxide, alumina and silica as main components and the content of zirconia as the nucleating agent are controlled to specific values, and furthermore a specific modification component is contained in addition to the main components and the nucleating agent.

(1) Main Components

The crystallized glass of the present invention contains zinc oxide, alumina and silica as the main components. The crystal glass of such a system can be expected to have a low thermal expansion coefficient and excellent heat resistance.

In a zinc oxide-alumina-silica-based crystallized glass, a crystalline phase is constituted of zinc oxide, alumina and silica as the main components. The crystalline phase includes zinc petallite (Zn-petallite: a mixture of $ZnO.Al_2O_3.3SiO_2$, $ZnO.2SiO_2$, $ZnO.Al_2O_3.8SiO_2$) solid solution, β-quartz (β-quartz: $SiO_2$) solid solution, gahnite (gahnite: $ZnO.Al_2O_3$), willemite (willemite: $2ZnO.SiO_2$), etc., and the thermal expansion coefficient of zinc petallite solid solution, β-quartz solid solution and willemite are relatively low while the thermal expansion coefficient of gahnite is conspicuously high.

Therefore, the crystallized glass of the present invention preferably contains as little gahnite as its crystalline phase as possible, and more preferably, contains substantially no gahnite (contains substantially 0% by mass of gahnite), and especially preferably, the main crystalline phase is a zinc petallite solid solution or a β-quartz solid solution. The "main crystalline phase" in the present invention means a crystalline phase having the strongest peak intensity of diffraction X-ray measured by a powder X-ray diffractometer (e.g., trademark: RINT 2500 manufactured by Rigaku Denki Co., Ltd.) at room temperature (25° C.)

In order to specifically form a zinc petallite solid solution or β-quartz solid solution in a zinc oxide-alumina-silica-based crystallized glass, it is necessary to control the constitutional ratio of the zinc oxide, alumina and silica which are contained as main components (hereinafter referred to as "main component constitutional ratio") to be a given value. Concretely, the zinc petallite solid solution or β-quartz solid solution specifically comprises the constitution shown by the part of oblique lines in the phase diagram of FIG. 1, namely, a limited constitution where the main components are constituted of 20–30% by mass of zinc oxide, 15–25% by mass of alumina and 50–60% by mass of silica, and these components amount to 100% in total by mass.

Table 2 shows the results of the evaluation of the crystalline phase and the thermal expansion coefficient of the zinc oxide-alumina-silica-based crystallized glasses having the main component constitutional ratios shown by marks (I)—(VII) in the phase diagram of FIG. 1. That is, zinc oxide-alumina-silica-based crystallized glasses having the main component constitutional ratios shown by the marks (I)–(VII) in FIG. 1 and containing a nucleating agent (zirconia) in the amount shown in Table 1 and a glass clarifier (antimony oxide ($Sb_2O_3$)) and containing no modification component were actually prepared (Reference Examples 1–7), and the crystalline phase of these crystallized glasses were evaluated based on the peak pattern of diffraction X-ray measured by a powder X-ray diffractometer at room temperature (25° C.) and the thermal expansion coefficient (average linear thermal expansion coefficient) in accordance with the method described in JIS R1618. The results are shown in Table 2.

Specifically, the crystalline phase was evaluated using a powder X-ray diffractometer having a rotating anode type target (Cu) and a graphite monochromator (trademark: RINT 2500 manufactured by Rigaku Denki Co., Ltd.) as a powder X-ray diffractometer under the conditions of X-ray source: CuKα ray, tube voltage: 50 kV, tube current: 30 mA, diffraction angle: 2θ=10°–40° and temperature: room temperature (25° C.). A crystalline phase having the strongest peak intensity of diffraction X-ray measured is taken as a main crystalline phase of the crystallized glass.

The thermal expansion coefficient was measured on a 3 mm×3 mm×20 mm sample cut out from the crystallized glass in the three temperature ranges of 40–400° C., 40–600° C. and 40–800° C. in accordance with the method of JIS R1618. The heat resistance was evaluated in the following manner. When a crystallized glass having a thermal expansion coefficient at 40–400° C. of not higher than that of lithia-based crystallized glass (not higher than $20\times10^{-7}$ (/° C.)) was obtained, this is indicated by "○"; when a crystallized glass having a thermal expansion coefficient at 40–400° C. of not higher than that of baria-based crystallized glass (not higher than $45\times10^{-7}$ (/° C.)) was obtained, this is indicated by "Δ" and when a crystallized glass having a thermal expansion coefficient at 40–400° C. of more than that of baria-based crystallized glass (higher than $45\times10^{-7}$ (/° C.)) was obtained, this is indicated by "x".

TABLE 1

| | | Main component | | | | Nucleating agent | Glass clarifier | Total of crystallized |
|---|---|---|---|---|---|---|---|---|
| | | Constitutional component ratio (100% by mass in total) | | | Total of | | | |
| | Mark in FIG. 1 | ZnO (% by mass) | $Al_2O_3$ (% by mass) | $SiO_2$ (% by mass) | main components (Part by mass) | $ZrO_2$ (Part by mass) | $Sb_2O_3$ (Part by mass) | glass (Part by mass) |
| Referential Exam. 1 | (I) | 25 | 20 | 55 | 100 | 5 | 0.5 | 105.5 |
| Referential Exam. 2 | (II) | 25 | 15 | 60 | 100 | 5 | 0.5 | 105.5 |
| Referential Exam. 3 | (III) | 20 | 20 | 60 | 100 | 5 | 0.5 | 105.5 |
| Referential Exam. 4 | (IV) | 30 | 15 | 55 | 100 | 5 | 0.5 | 105.5 |
| Referential Exam. 5 | (V) | 20 | 25 | 55 | 100 | 5 | 0.5 | 105.5 |
| Referential Exam. 6 | (VI) | 30 | 20 | 50 | 100 | 5 | 0.5 | 105.5 |
| Referential Exam. 7 | (VII) | 25 | 25 | 50 | 100 | 5 | 0.5 | 105.5 |

TABLE 2

| | Crystallizing temp. 850° C. | | | | Crystallizing temp. 875° C. | | | |
|---|---|---|---|---|---|---|---|---|
| | Average linear thermal expansion coefficient × $10^{-7}$ (/° C.) | | | Crystalline phase | Average linear thermal expansion coefficient × $10^{-7}$ (/° C.) | | | Crystalline phase |
| | 40–400° C. | 40–600° C. | 40–800° C. | | 40–400° C. | 40–600° C. | 40–800° C. | |
| Referential Exam. 1 | 12.9 | 13.7 | 18.7 | Qu(Pe) | −0.7 | 0.5 | 1.1 | Qu(Pe,Wi) |
| Referential Exam. 2 | 6.9 | 9.5 | 11.4 | Pe | 6.8 | 9.3 | 11.4 | Pe |
| Referential Exam. 3 | 8.4 | 9.2 | 12.4 | Qu | — | — | — | Qu |
| Referential Exam. 4 | 9.3 | 11.6 | 14.0 | Pe(Wi) | — | — | — | Pe(Wi) |
| Referential Exam. 5 | 24.3 | 24.9 | 24.9 | Amorphous | 24.3 | 24.9 | 24.9 | Qu(Ga) |
| Referential Exam. 6 | 30.1 | uncalculable | uncalculable | Amorphous | — | — | — | Pe(Qu, Wi, Ga) |
| Referential Exam. 7 | 30.8 | uncalculable | uncalculable | Amorphous | −2.1 | −2.0 | −2.8 | Qu(Ga) |

TABLE 2-continued

| | | Crystallizing temp. 900° C. | | | |
|---|---|---|---|---|---|
| | | Average linear thermal expansion coefficient × $10^{-7}$ (/° C.) | | | Crystalline phase | Evaluation Heat resistance |
| | | 40–400° C. | 40–600° C. | 40–800° C. | | |
| | Referential Exam. 1 | −5.1 | −4.8 | −3.5 | Qu(Pe,Wi) | ◯ |
| | Referential Exam. 2 | 7.3 | 10.6 | 12.2 | Pe | ◯ |
| | Referential Exam. 3 | −14.3 | −14.3 | −13.5 | Qu | ◯ |
| | Referential Exam. 4 | — | — | — | Pe(Wi) | ◯ |
| | Referential Exam. 5 | 35.4 | 35.3 | 35.2 | Qu(Ga) | Δ |
| | Referential Exam. 6 | 0.7 | 4.2 | 7.3 | Pe(Qu, Wi, Ga) | ◯ |
| | Referential Exam. 7 | 11.4 | 11.4 | 10.7 | Qu(Ga, Wi) | ◯ |

In Column of crystalline phase, the bold letters means main crystalline phase and letters in parentheses indicate other crystalline phases, and Qu: β-quartz solid solution, Pe: zinc-petallite solid solution, Wi: willemite, and Ga: gahnite.
In Column of average linear thermal expansion coefficient, "uncalculable" shows that the calculation was impossible due to the presence of transition point and yielding point on thermal expansion curve.

As shown in Table 2, in the zinc oxide-alumina-silica-based crystallized glasses having the main component constitutional ratio shown by the marks (I)–(VII) in FIG. 1, the main crystalline phases thereof were all zinc petallite solid solution or β-quartz solid solution, and the thermal expansion coefficients were not higher than that of baria-based crystallized glasses ($30 \times 10^{-7}$ (/° C.)–$45 \times 10^{-7}$ (/° C.)), and the zinc oxide-alumina-silica-based crystallized glasses which were set at the proper conditions in the main component constitutional ratio and crystallizing temperature showed a small value comparable to the thermal expansion coefficient of lithia-based crystallized glasses ($0 \times 10^{-7}$ (/° C.)–$20 \times 10^{-7}$ (/° C.)).

As mentioned above, the zinc oxide-alumina-silica-based crystallized glasses in which the main components are constituted by 20–30% by mass of zinc oxide, 15–25% by mass of alumina and 50–60% by mass of silica, such that these components amount to 100% in total by mass, have a main crystalline phase of zinc petallite solid solution or β-quartz solid solution, and hence have a low thermal expansion coefficient and excellent heat resistance. Among them, the crystallized glass having a main component constitutional ratio employed in Reference Example 1 or 3 is preferred. The zinc oxide-alumina-silica-based crystallized glasses having the above main component constitutional ratios are preferred in that they have a very low thermal expansion coefficient and excellent heat resistance comparable to those of lithia-based crystallized glasses. In addition, they are semi-transparent glasses that exhibit less haze and easily transmit infrared rays, and hence hardly show a rising of the inner temperature due to heat accumulation in the case of being used as a reflector substrate. Furthermore, the resulting crystallized glasses are stably low in thermal expansion coefficient irrespective of the production conditions such as crystallizing temperature. Moreover, the crystallized glass having the main component constitutional ratio employed in Reference Example 1 is particularly preferred in that when made into reflector substrates, the difference between thermal expansion coefficient of the substrate and the reflective material to be vapor deposited thereon can be made small, and thus the occurrence of cracks in the reflective material can be effectively inhibited.

In comparison with the crystallized glass having a main component constitutional ratio employed in Reference Example 1 or 3, the crystallized glass having the main component constitutional ratio employed in Reference Example 5 has a somewhat higher thermal expansion coefficient and is somewhat inferior in heat resistance because gahnite is apt to be formed, and the crystallized glass having the main component constitutional ratio employed in Reference Examples 2 or 4 is a hazed white opaque glass and absorbs infrared light, and hence is apt to experience a rise of the inner temperature due to heat accumulation when used as a reflector substrate. Moreover, finding failures such as inner defects is difficult by visual examination. The crystallized glass having the main component constitutional ratio employed in Reference Examples 6 or 7 has the possibility that the thermal expansion coefficient varies greatly depending on the production conditions such as crystallizing temperature or the crystallization does not surely proceed.

It is needless to say that the crystallized glasses having these main component constitutional ratios also have a thermal expansion coefficient that is not higher than that of baria-based crystallized glass and have excellent heat resistance. It has been reported that even in the case of zinc oxide-alumina-silica-based crystallized glasses in which the main components are constituted of 20–30% by mass of zinc oxide, 15–25% by mass of alumina and 50–60% by mass of silica, those which contain no modification component mentioned hereinafter are low in melting point and insufficient in meltability although they are good in heat resistance. These crystallized glasses have a problem of being inferior in moldability. Therefore, for the crystallized glass of the present invention, it is an essential requirement for the crystallized glass to contain a specific modification component referred to hereinafter.

(2) Nucleating Agent

The crystallized glass of the present invention contains zirconia as a nucleating agent. The "nucleating agent" in this specification means a substance for acceleration of the precipitation of fine glass crystals.

Generally, titania ($TiO_2$) or the like is contained as a nucleating agent for crystallized glass, while the nucleating agent in the crystallized glass of the present invention must contain zirconia. In a crystallized glass containing titania as a nucleating agent, gahnite having a very high thermal expansion coefficient is readily formed, the thermal expansion coefficient of the crystallized glass per se tends to increase and the crystallized glass is sometimes inferior in heat resistance. The crystallized glass containing zirconia as a nucleating agent is preferred because these problems are not caused.

Zirconia, as the nucleating agent, must be contained in an amount of 3–6 parts by mass based on 100 parts by mass of the main components. If the content is less than the above range, zirconia does not exhibit the effect as a nucleating agent and there is the possibility of insufficient glass crystallization, which is not preferred. If the content exceeds the above range, there is the possibility that melting the nucleating agent before crystallization becomes difficult, which is also not preferred.

The reflector substrate can be made from the crystallized glass of the present invention by preparing a glass raw material by mixing the main components, the nucleating agent and the modification component at a given ratio, melting the glass raw material to make molten glass, molding the molten glass to a desired shape, and subjecting the molded product to a heat treatment (crystallization treatment). During the steps of melting and molding of the glass raw material, devitrification phenomenon rarely occurs and an increase in the surface roughness of the molded product caused by recrystallization of zirconia as the nucleating agent rarely occurs.

The frequency of the occurrence of the above phenomena is not so high. However, the devitrification phenomenon may make the crystallized glass heterogeneous and an increase in the surface roughness of the molded product may deteriorate the reflective characteristics of reflector, and hence, it is preferred to inhibit the occurrence of these phenomena as much as possible.

Under the circumstances, the inventors have conducted intensive investigation and have found that adding tin dioxide ($SnO_2$) as a nucleating agent in place of part of the zirconia as a nucleating agent effectively inhibits zirconia recrystallization during the steps of melting and molding the glass raw material, and accordingly inhibits the occurrence of the devitrification phenomenon and an increase of surface roughness of the molded product. That is, it is preferred that the crystallized glass of the present invention contains tin dioxide as a nucleating agent in place of a part of zirconia as a nucleating agent, and, if necessary, contains both zirconia and tin dioxide as nucleating agents in a total amount of 3–6 parts by mass based on 100 parts by mass of the main components.

In order to inhibit zirconia recrystallization during melting and molding of the glass raw material in crystallized glass containing only zirconia as the nucleating agent, it is effective to set the content of zirconia as the nucleating agent at 3 parts by weight or less based on 100 parts by mass of the main components. However, such crystallized glass tends to experience insufficient crystal nucleus formation due to the low content of the nucleating agent, and is sometimes inferior in crystallinity.

On the other hand, in the case of the crystallized glass containing tin dioxide as a nucleating agent in place of a part of zirconia as a nucleating agent, zirconia recrystallization during melting and molding of the glass raw material can be inhibited while maintaining good crystallinity, and in addition, the melting temperature of the glass can be lowered and the meltability can be improved, which is preferred.

Tin dioxide as a nucleating agent is preferably contained in an amount of 0.5–4 parts by mass, more preferably 0.5–2 parts by mass based on 100 parts by mass of the main components. If the content is less than the above range, there is the possibility that the effect of inhibiting zirconia recrystallization cannot be exhibited, which is not desired. If the content is more than the above range, tin oxide per se is apt to be recrystallized, and there is the possibility that the devitrification phenomenon will occur as well as an increase in the surface roughness of the molded product as in the case of zirconia.

When tin dioxide as a nucleating agent is contained in place of all of the zirconia as a nucleating agent (namely, when only tin dioxide is contained as the nucleating agent), the devitrification phenomenon during the glass raw material melting and moldings steps can be avoided and an increase in the surface roughness of the molded product can also be sometimes avoided. However, since the formation of gahnite (having a very high thermal expansion coefficient) and willemite (higher in thermal expansion coefficient than zinc petallite solid solution or β-quartz solid solution) may be brought about, the thermal expansion coefficient of the crystallized glass per se increases, sometimes causing deterioration of heat resistance.

In the crystallized glass containing tin dioxide as a nucleating agent, it is preferred that zirconia as the nucleating agent is contained in an amount of 2–3 parts by mass based on 100 parts by mass of the main components. When the content is as mentioned above, recrystallization of zirconia at the steps of melting and molding of the glass raw material can be inhibited with maintaining the good crystallinity.

Taking the above facts into consideration, the crystallized glass of the present invention most preferably contains 3 parts by mass of zirconia and 2 parts by mass of tin dioxide as nucleating agents based on 100 parts by mass of the main components. In the case of such recrystallized glass, the recrystallization of zirconia during the steps of melting and molding of the glass raw material can be effectively inhibited with maintaining the good crystallinity, and the main crystalline phase can also be zinc petallite solid solution or β-quartz solid solution and hence, the thermal expansion coefficient of the recrystallized glass is low and it exhibits a heat resistance comparable to that of lithia-based crystallized glasses.

(3) Modification Component

The crystallized glass of the present invention contains one component selected from the group consisting of lithium oxide, sodium oxide, potassium oxide, diphosphorus pentoxide, niobium oxide and tantalum oxide as a modification component. The "modification component" in this specification means a substance which electrostatically bonds to uncross linked oxygen in the crystal structure formed of the main components to affect various physical properties of the glass.

Usually, the modification components include, for example, oxides of alkali metals (lithium, sodium, potassium, rubidium, cesium, and the like), oxides of alkaline earth metals (magnesium, calcium, strontium, barium, and the like), oxides of transition metals (yttrium, vanadium, niobium, tantalum, molybdenum, and the like), oxides of nonmetals (boron, phosphorus, and the like), and furthermore bismuth oxide ($Bi_2O_3$), but it is necessary that the crystallized glass of the present invention contains at least one component selected from the group consisting of lithium oxide, sodium oxide, potassium oxide, diphosphorus pentoxide, niobium oxide and tantalum oxide (hereinafter sometimes abbreviated as the "6 components") as a modification component.

The crystallized glasses containing at least one of the above 6 components as a modification component having a more stable thermal expansion coefficient and more excellent heat resistance, meltability and moldability than a crystallized glass that does not contain any of the above 6 components. Among them, the crystallized glass containing lithium oxide as a modification component has an especially low melting point (about 1450–1500° C.) and good meltability, and, hence, when the glass is molten and molded into a reflector substrate, no special equipment (melting furnace or the like) designed to withstand high temperatures of higher than 1500° C. is needed, and there are less restrictions on the production conditions. That is, the reflector substrate can be very simply produced. Furthermore, crystallized glasses containing oxides of alkali metals, such as lithium oxide, sodium oxide and potassium oxide as modification components have better crystallinity than those containing diphosphorus pentoxide as a modification component. Moreover, crystallized glasses containing niobium oxide or tantalum oxide have good meltability in addition to a low crystallizing temperature and good crystallinity.

The total content of the 6 components as modification components is preferably 0.2–5.0 parts by mass, more preferably 0.5–4.6 parts by mass based on 100 parts by mass of the main components. If the content is less than the above range, there is the possibility that the modification component will not exert any effect, which is not preferred, and if it exceeds the above range, there is the possibility that the thermal expansion coefficient will increase, which is also not preferred.

The preferred content of lithium oxide is 0.3–0.75 parts by mass based on 100 parts by mass of the main components. If the content is less than the above range, there is the possibility that the effect of improving the meltability of the glass by lithium oxide cannot be achieved, which is undesirable. If the content exceeds the above range, there is the possibility that the crystallization is insufficient due to the low crystallinity of the glass, which is also undesirable.

The preferred content of diphosphorus pentoxide is 1–3 parts by mass based on 100 parts by mass of the main components. If the content is less than the above range, there is the possibility that the effect of improving the meltability of the glass by diphosphorus pentoxide cannot be achieved, which is undesirable. If the content exceeds the above range, there is the possibility that the crystallization would be insufficient due to the low crystallinity of the glass, which is also not preferred.

The preferred content of sodium oxide is 0.4–1 part by mass based on 100 parts by mass of the main components. If the content is less than the above range, there is the possibility that the effect of improving the crystallinity of the glass by sodium oxide cannot be obtained, which is also not preferred.

The preferred content of potassium oxide is 0.5–1.5 parts by mass based on 100 parts by mass of the main components. If the content is less than the above range, there is the possibility that the effect of improving the crystallinity by potassium oxide cannot be exerted, which is not preferred.

The preferred content of niobium oxide is 0.1–0.5 parts by mass based on 100 parts by mass of the main components. If the content is less than the above range, there is the possibility that the effect of improving meltability, lowering crystallizing temperature and improving crystallinity by niobium oxide cannot be achieved, which is not preferred.

The preferred content of tantalum oxide is 0.1–0.5 parts by mass based on 100 parts by mass of the main components. If the content is less than the above range, there is the possibility that the effect of improving meltability, lowering crystallizing temperature and improving crystallinity by tantalum oxide cannot be exerted, which is not preferred.

The crystallized glass of the present invention may contain other modification components so long as it contains at least one of the above 6 components as a modification component. For example, it is preferred to contain about 0.1–0.5 parts by mass of vanadium oxide ($V_2O_5$) or molybdenum oxide ($MoO_3$) as a modification component based on 100 parts by mass of the main components. However, the content of these other modification components should be limited to a range without damaging the preferred effects of the crystallized glass of the present invention, namely, the effects of having a thermal expansion coefficient of not higher than that of baria-based crystallized glasses and having excellent heat resistance.

An important point in the crystallized glass of the present invention is that when it contains oxides of alkaline earth metals (magnesium oxide (MgO), calcium oxide (CaO), strontium oxide (SrO), barium oxide (BaO), boron oxide ($B_2O_3$), yttrium oxide ($Y_2O_3$), bismuth oxide ($Bi_2O_3$)) which are generally suitably used as modification components of crystallized glasses, the effect of improving heat resistance is rather reduced. This is because if these components are contained as modification components, since formation of crystalline phase (gahnite, spinel ($MgO.Al_2O_3$), or the like) of high thermal expansion coefficient is readily brought about, the thermal expansion coefficient of the glass increases and the heat resistance decreases. Particularly, crystallized glass containing boron oxide as a modification component shows a more conspicuous increase of the thermal expansion coefficient and decrease of the heat resistance. Therefore, it is preferred for the crystallized glass of the present invention to contain substantially no boron oxide as at least a modification component (contain substantially 0% by mass of boron oxide as a modification component).

(4) Additives

The crystallized glass of the present invention may contain additives depending on purpose in addition to the main components, nucleating agent and modification component. For example, adding antimony oxide ($Sb_2O_3$) in an amount of about 0.5 parts by mass based on 100 parts by mass of the main components as a glass clarifier is preferred in that it can reduce bubbles generated while the glass is melting and allow hardly any bubbles to remain in the glass.

(5) Crystallized Glass

The crystallized glass of the present invention can be obtained by mixing the above-mentioned main components, nucleating agent and modification component at a given ratio to prepare a glass raw material, melting the glass raw material to make a glass, and subjecting the glass to a heat treatment (crystallization treatment) at a high temperature of about 800–900° C. for about 2–4 hours.

The crystallized glass can also be obtained by producing the glass raw material by using, in place of the above main components, nucleating agent and modification component, precursors which can be converted to these components by heating (for example, carbonates, nitrates, and the like), mixing them so as to give a given ratio in terms of oxides to prepare a glass raw material, melting the glass raw material to make a glass, and subjecting the glass to a heat treatment (crystallization treatment) under the similar conditions to those mentioned above.

If the treating temperature and time are less than the above ranges, there is the possibility that crystallization of glass would not sufficiently proceed, resulting in decrease of crystallinity, which is not preferred. If they exceed the above ranges, a crystalline phase (gahnite, willemite, or the like) having a high thermal expansion coefficient is readily formed, the thermal expansion coefficient of the glass increases, and the heat resistance decreases, which is not preferred.

The crystallized glass of the present invention obtained as mentioned above has a high heat resistance, a low melting point and good meltability, and, furthermore, has superior crystal stability over time under high temperature conditions and an extremely small volumetric contraction even after being exposed to high temperatures for a long time.

Figure 2:
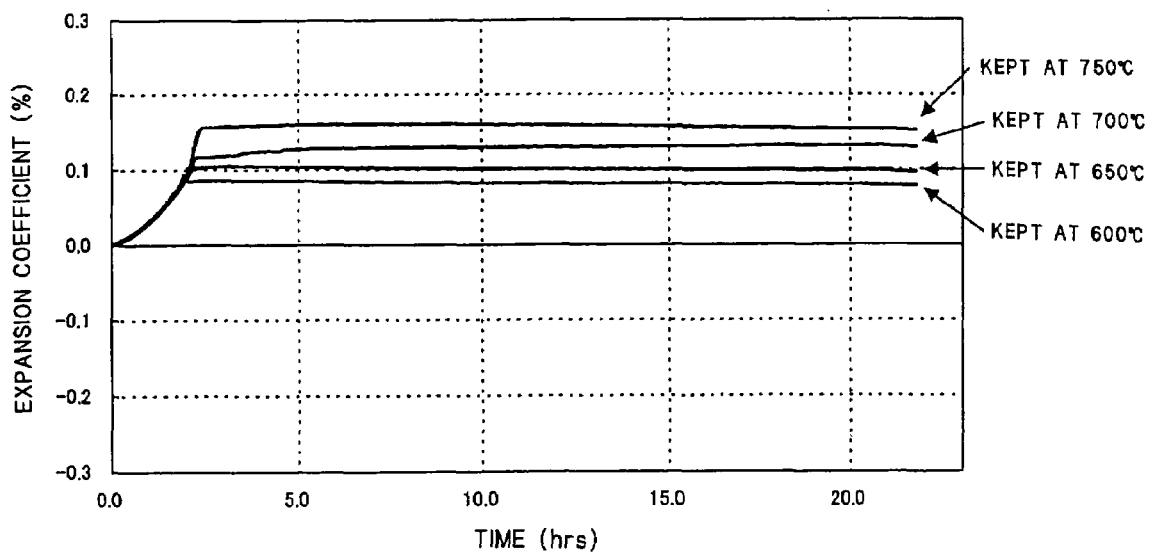
FIG. 2 is a graph which shows changes with elapse of time of thermal expansion coefficient of the crystallized glass of Example 50.

FIG. 2 is a graph which shows change of volumetric thermal expansion coefficient over time when the crystallized glasses of the present invention were kept at 600° C., 650° C., 700° C. and 750° C. for each 20 hours. As shown in FIG. 2, the expansion coefficient (expansion of volume) of the crystallized glasses of the present invention increased until the temperature of the glasses reached the locking temperature, but after reaching the locking temperature, the glasses maintained a nearly constant expansion coefficient (volume) and the expansion coefficient (volume) hardly changed even after a lapse of 20 hours.

Figure 3:
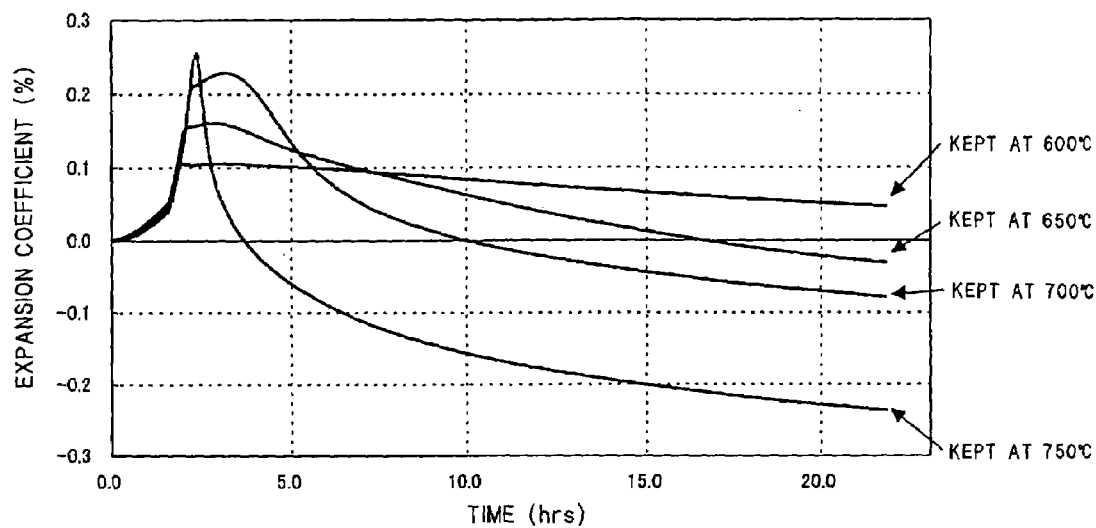
FIG. 3 is a graph which shows changes with elapse of time of thermal expansion coefficient of the crystallized glass of Comparative Example 14.

On the other hand, when the same test was conducted on lithia-based crystallized glasses, as shown in FIG. 3, after the temperature of the glasses reached the locking temperature and the expansion coefficient (volume) reached the maximum value, the glasses showed an abrupt decrease of the expansion coefficient (volume). This behavior had the tendency to become conspicuous over longer times. That is, lithia-based crystallized glasses show volumetric contraction when they are exposed to high temperatures for a long time.

The reason for the lithia-based crystallized glasses taking such behavior is that the crystalline phase changes over time because they are kept under high temperature conditions. Specifically, the reasons may be due to (i) an increase of the density (contraction of volume) due to the growth of crystal grains, (ii) a change of the crystalline phase from a β-eucryptite solid solution (thermal expansion coefficient $\leqq 0$) to a β-spodumene solid solution (thermal expansion coefficient $\geqq 0$), etc. That is, since the lithia-based crystallized glasses have insufficient crystal stability over time under high temperature conditions, they show a volumetric contraction upon being exposed to high temperatures for a long time.

Therefore, when a reflector substrate is formed of a lithia-based crystal glass, the growth of crystal grains proceeds during long-term use and volumetric contraction occurs, and hence, there is the possibility that the shape of the reflector substrate will change. Such a shape change is not desirable because is causes a deterioration of the reflective characteristics or a deviation in the condensation point.

Being different from the lithia-based crystallized glass, the crystallized glass of the present invention exhibits less of the above-mentioned defects and, hence, is suitable as material for constructing a reflector substrate which is required to have such endurance as to withstand long-term uses of 5000–10000 hours under high temperature conditions greater than 600° C. It is needless to say that the crystallized glass of the present invention is a very useful material, considering that recently, light source lamps used for illuminators and projector light sources have an increased output and luminance, and thus the reflector substrate tends to be exposed to the higher temperatures.

(6) Reflector Substrate

As already mentioned above, the crystallized glass of the present invention is suitably usable as a reflector substrate constituting a reflector for reflecting the light of a light source lamp, particularly, as a material constituting a reflector substrate of an illuminator or a projector light source.

The reflector substrate is a member having a concave formed for disposing a reflective film thereon. The shape of the concave has no limitation so long as the desired reflecting characteristics can be obtained when the reflective film is disposed thereon. Usually, the concave is in the form of a rotating second-order surface (e.g., paraboloid, ellipsoid, etc.), and an ellipsoid having excellent in condensation efficiency for reflected light is preferred.

There are no particular limitations on the construction of the parts of the reflector substrate other than the concave part, and various constructions can be used depending on the purpose. As a general construction, mention may be made of reflector substrate 10 shown in FIG. 4. The reflector substrate 10 shown in FIG. 4 comprises two parts of a bowl-shaped part 14 and a neck part 16. The boundary portion of the bowl-shaped part 14 and the neck part 16 forms a constricted part 15. In the bowl-shaped part 14, a concave 12 is formed for disposing a reflective film therein, and the neck part 16 is provided on the bottom side of the concave 12 in continuity with the bowl-shaped part 14. Furthermore, an inner space 18 is formed by the concave 12 of the bowl-shaped-part 14, and at the neck part 16 there is formed a through hole 20 for fitting a light source lamp which opens at the inner space 18 of the bowl-shaped 14.

The above reflector substrate can be produced, for example, by using a mold to press mold a mold a molten glass mass (called a "gob") that is prepared by melting a glass raw material at a high temperature.

Examples of a mold that can be used for molding the reflector substrate include the reflector substrate molding mold 30 shown in FIG. 5, which is provided with a mold 32 having a concave portion 32*a* having a shape that is complementary to the outer shape of the reflector substrate 31, a core rod 34 having a convex portion 34*a* having a shape that is complementary to the inner space of the reflector substrate 31, and a ring 36 having a guide hole 36*a* guiding the core rod 34 to the concave portion 32*a* of the mold 32 and which is constructed so that a cavity 33 for molding the reflector substrate 31 is formed by the mold 32, the core rod 34 and the ring 36 together.

Using the reflector substrate molding mold 30 as mentioned above, the reflector substrate can be molded by the following method. First, a gob 38 is fed from a gob-feeding nozzle 35 ((*a*) in FIG. 5), and the gob 38 is cut by a cutting blade 37, thereby pouring a given amount of gob 38 into the concave portion 32*a* of the mold 32 ((*b*) in FIG. 5).

Then, the ring 36 is put on the top face of the mold 32, core rod 34 is loosely inserted into the guide hole 36a of the ring 36, and there after the core rod 34 is downwardly pressed ((c)–(e) in FIG. 5). Thus, the core rod 34 is guided to the concave portion 32a of the mold 32, and simultaneously the mold 32, core rod 34 and ring 36 form together a cavity 33 for molding the reflector substrate 31, and, as a result, it becomes possible to mold the reflector substrate 31 ((f) in FIG. 5). In this case, most of the outer shape of the reflector substrate 31 is molded by the mold 32 having the concave portion 32a having a shape that is complementary to the outer shape, and most of the inner space of the reflector substrate 31 is molded by the core rod 34 having the convex portion 34a having a shape that is complementary to the shape of the inner space.

After completion of the molding, the reflector substrate 31 is sufficiently cooled, and then first the core rod 34 is pulled up. In this case, since the reflector substrate 31 is pressed downwardly by the ring 36, it is not pulled up together with the core rod 34 and is retained inside the mold 32. Then, the ring 36 is pulled upwardly to disjoint the mold, and the reflector substrate 31, which is the molded product, is removed from the mold 32. In this way, the reflector substrate 31, which is a molded product, can be obtained.

Figure 4:
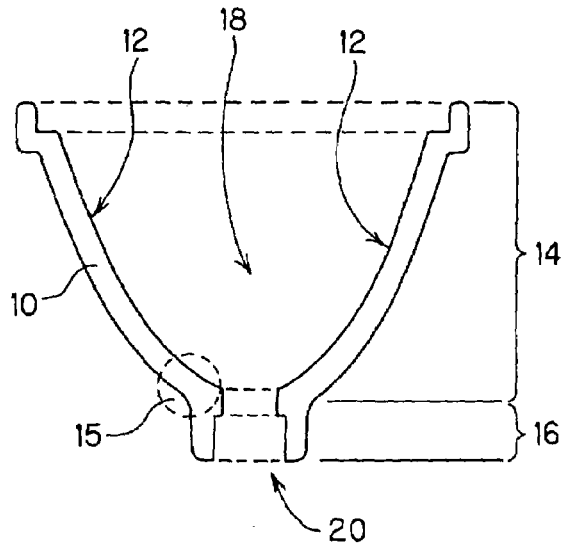
FIG. 4 is a side sectional view which shows a general construction of a reflector substrate.
Figure 6:
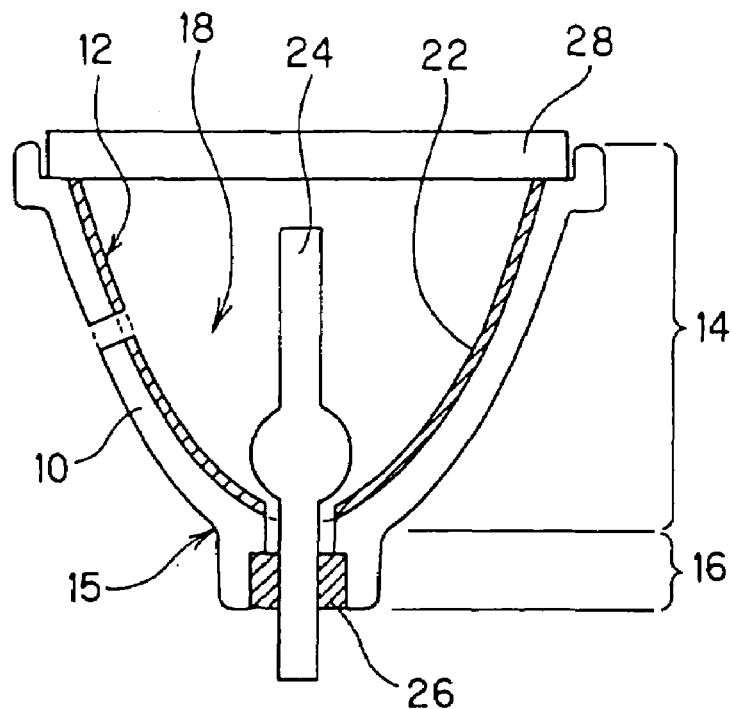
FIG. 6 is a side sectional view which shows a state of use of a reflector substrate.

As shown in FIG. 4 and FIG. 6, a hole is bored on the lower end side of the neck part 16 by mechanical processing or the like to form a through hole 20 for fitting a light source lamp. Then, a reflective film 22 is disposed to cover the concave 12, whereby a reflector can be obtained.

The construction of the reflective film is not particularly limited as long as the desired reflecting characteristics can be obtained. For example, an alternate multilayer film comprising alternately laminated materials of high refractive index such as titania ($TiO_2$) and those of low refractive index such as silica ($SiO_2$) can be suitably used. Known film forming methods can be used to form the reflective films. In the case of the above alternate multilayer films, a material have a high refractive index and a material having a low refractive index can be alternately laminated using conventionally known film forming methods (such as PVD, CVD, and sputtering).

As shown in FIG. 6, a light source lamp 24, such as an ultrahigh pressure mercury lamp, is fitted in the through hole 20 for providing light source lamp. This light source lamp 24 is fixed with a fixing material 26 such as a heat resistant cement, and furthermore, the opening part of the inner space 18 is closed with a glass-made protective plate 28 (about 4–5 mm thick) to make a light emitting apparatus. The protective plate 28 is provided to inhibit the scattering of broken pieces if the light source lamp is broken over its useful lifetime.

Figure 7A:
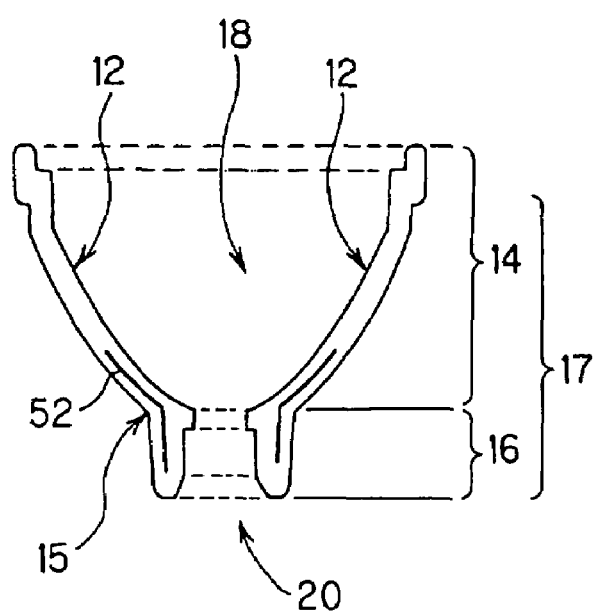
FIG. 7(a) is a side sectional view which shows a construction of the reflector substrate of the present invention.
Figure 7B:
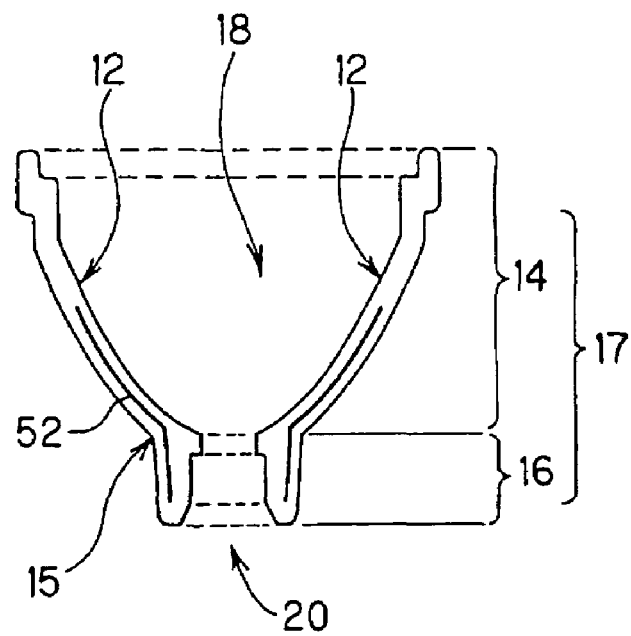
FIG. 7(b) is a side sectional view which shows a construction of the reflector substrate of the present invention.
Figure 7C:
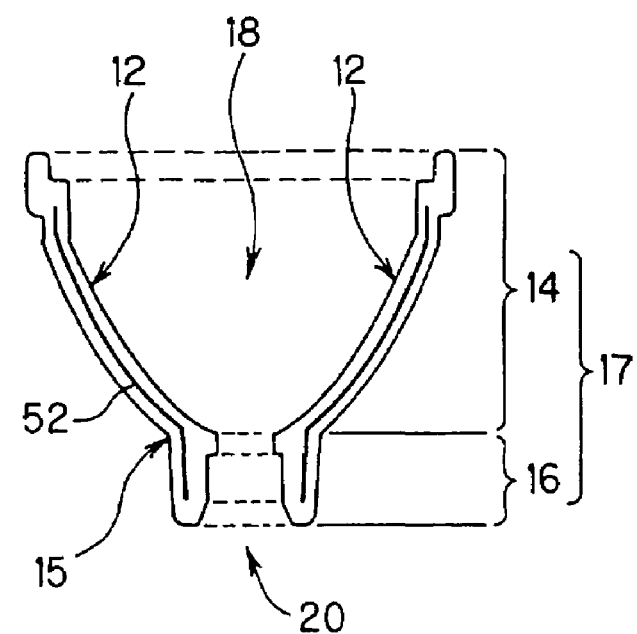
FIG. 7(c) is a side sectional view which shows a construction of the reflector substrate of the present invention.

In the above, the present invention has been explained referring to an example of a reflector substrate of a general construction, but it is also a preferred embodiment to use the crystallized glass of the present invention as a constituting material of a reflector substrate provided with a main body having a concave formed for disposing a reflective film and a metallic reticulate body embedded in the main body. That is, a reflector substrate 50 shown in FIG. 7(a)–FIG. 7(c) is preferred, which is provided with a main body 17 comprising the crystallized glass of the present invention and having a concave 12, which is a reflecting surface, and a metallic reticulate body 52 embedded in the main body 17.

The characteristic construction of the above reflector substrate 50 is that a metallic reticulate body 52 is embedded in the main body of the reflector substrate 50. The reticulate body 52 is provided to inhibit the scattering of broken pieces if the reflector substrate per se is broken over its useful lifetime. Such a reflector substrate is preferred because it can improve the safety of the light emission apparatus during use and prevent other devices (for example, a liquid crystal projector) that are attached to the apparatus from being damaged.

The reticulate body 52 must be embedded inside the main body 17 of the reflector substrate 50, and the embedding position is not particularly limited. Therefore, it may be optionally provided in accordance with the purpose, and usually, it is embedded such that it wraps at least a part of the concave 12 along the concave 12.

The reticulate body 52 must be disposed so that it wraps the concave 12 of the main body 17 along the concave 12, but except for this point, there are no particular limitations in the position of disposing the reticulate body 52. Disposition of the reticulate body 52 to wrap the whole concave 12 as shown in FIG. 7(c) is preferred because the effect of inhibiting the scattering of broken pieces by the reticulate body 52 is great, but the reticulate body 52 may not necessarily be disposed to wrap the whole concave 12. For example, as shown in FIG. 7(a) and FIG. 7(b), the effect of the present invention can be obtained when at least a part of the concave 12 is wrapped with the reticulate body 52.

In the case of the main body being composed of the two parts of the bowl-shaped part 14 and the neck part 16 as in the reflector substrate 50 shown in FIG. 7(a)–FIG. 7(c), the constriction part 15, which is a boundary portion between the bowl-shaped part 14 and the neck part 16, is weak against heat stress and can be readily broken. Therefore, as shown in FIG. 7(a), when the reticulate body 52 is disposed at least in the vicinity of the constriction part 15, the effect can be sufficiently exerted. Furthermore, it is also preferred to continuously dispose the reticulate body 52 from the bowl-shaped part 14 up to the neck part 16 through the constriction part 15 as in the reflector substrate 50 shown in FIGS. 7(a)–7(c).

The metals constituting the reticulate body are not particularly limited, and it is preferred that the materials are selected in consideration of the main body which comprises a crystallized glass.

First, since the reticulate body is embedded in the main body of the reflector substrate, it contacts with a high temperature gob during production of the reflector substrate. Therefore, it is preferred to select a material having excellent oxidation resistance in order to produce the reflector substrate in an atmospheric environment without carrying out nitrogen purging. Furthermore, since the reflector substrate is used under high temperature conditions, it is preferred that the material of the reticulate body has a thermal expansion coefficient that is close to that of the crystallized glass constituting the main body, a high Young's modulus and excellent spreadability.

From the above viewpoints, the reticulate body preferably comprises at least one metal selected from the group consisting of nickel, cobalt, stainless steel and Kovar as a main constituent. By selecting the above metals, it becomes possible to produce the reflector substrate in an atmospheric environment without carrying out nitrogen purging, and the breakage of the reflector substrate due to a difference in thermal expansion behavior between the main body and the reticulate body can be effectively inhibited.

The "main constituent" means that the whole of the reticulate body is not required to be composed of the above metal, but it suffices that the reticulate body is mainly composed of the above metal. Specifically, it means that 30% by mass or more of the metal constituting the reticulate body is the above metal.

Furthermore, since the reflector substrate is subjected to a heat treatment (crystallization treatment) at high temperatures after molding, it is preferred to select a material that is capable of accelerating the crystallization. From this viewpoint, the reticulate body comprises preferably at least one metal selected from the group consisting of gold, platinum, silver and copper as a main constituent. These metals are preferred because they can be crystal nuclei of the glass and hence can accelerate crystallization of glass and fine the crystals. The same effect can be obtained when the reticulate body has a surface coat comprising the above metal.

The reticulate body must have a network structure, but other constructions can be optionally determined depending on the properties of the crystallized glass, the size of the reflector substrate and the effect of inhibiting the scattering of broken pieces. For example, the shape of the meshes can be square, rhombic, hexagonal, and the like, and the mesh size is suitably about 3–10 mm. The reticulate body is often formed of metal wires having a diameter of about 0.1–1.0 mm$\phi$, and may be formed of metal foils having a width that is nearly the same as the above wire diameters.

The reflector substrate in which the above reticulate body is embedded can be produced in accordance with a method for producing a reflector substrate of general construction as shown in FIG. 5. That is, it may be produced by a method of press molding gob 38 using a reflector substrate molding mold 30 provided with mold 32, core rod 34 and ring 36 as shown in FIG. 8. According to this method, the reflector substrate 50, in which the reticulate body 52 is embedded, can be obtained using the same steps as those of the method shown in FIGS. 5 ((*b*)–(*g*) in FIG. 8), except that the reticulate body 52 is previously set in the concave part 32*a* of the mold 32 before the gob 38 is poured ((a) in FIG. 8).

EXAMPLES

The crystallized glass of the present invention will be specifically explained using the following examples, which should not be construed as limiting the crystallized glass of the present invention in any manner. The crystallized glasses of the examples and the comparative examples were evaluated based on the four characteristics of heat resistance, crystallinity, meltability and devitrification properties, and the overall evaluation was conducted based on the results of the above evaluations. The four characteristics of heat resistance, crystallinity, meltability and devitrification properties were evaluated using the following methods.

Heat Resistance

Measurement samples of 3 mm×3 mm×20 mm were cut out from the crystallized glass, and the thermal expansion coefficients were measured in three temperature ranges of 40–400° C., 40–600° C. and 40–800° C. in accordance with the method described in JIS R1618. The heat resistance was evaluated in the following manner. When a crystallized glass having a thermal expansion coefficient at 40–400° C. of not higher than that of lithia-based crystallized glass (not higher than $20\times10^{-7}$ (/° C.)) was obtained, this is indicated by "○"; when a crystallized glass having a thermal expansion coefficient at 40–400° C. of not higher than that of baria-based crystallized glass (not higher than $45\times10^{-7}$ (/° C.)) was obtained, this is indicated by "Δ"; and when only such a crystallized glass as having a thermal expansion coefficient at 40–400° C. of higher than that of baria-based crystallized glass (higher than $45\times10^{-7}$ (/° C.)) was obtained, this is indicated by "x".

Crystallinity

The crystallinity is shown in the following manner. When the minimum temperature at which the glass could be crystallized was lower than 850° C., this is indicated by "○", when it was 850–900° C., this is indicated by "Δ"; and when it was higher than 900° C., this is indicated by "x".

Meltability

As for the evaluation of meltability, when the melting temperature of the crystallized glass was lower than 1500° C., this is indicated by "○"; when it was 1500–1530° C., this is indicated by "Δ"; and when it was higher than 1530° C., this is indicated by "x".

Devitrification Properties

The devitrification properties were evaluated by the frequency of occurrence of devitrification phenomenon when the glass raw material for the crystallized glass was melted to make a molten glass and the molten glass was molded into the shape of the reflector substrate. In the case of producing 100 reflector substrates (samples), when no devitrification phenomenon occurred in any of the samples, this is indicated by "⊚"; when devitrification phenomenon occurred in two or less samples, this is indicated by "○"; when it occurred in five or less samples, this is indicated by "Δ"; and when it occurred in six or more samples, this is indicated by "x".

Overall Evaluation

As for the overall evaluation on the crystallized glasses of Examples 1–43 and Comparative Examples 1–10, when evaluation of the three characteristics of heat resistance, crystallinity and meltability were all "○", this is indicated by "⊚"; when evaluation of two of these characteristics were "○", this is indicated by "○"; and other cases are indicated by "Δ", but when at least one of the heat resistance and the meltability among the three characteristics was evaluated by "x", the overall evaluation is indicated by "x" irrespective of the above criteria.

As for the overall evaluation of the crystallized glasses of Examples 44–50 and Comparative Examples 11–13, when on the evaluation of heat resistance, crystallinity and meltability were all "○"and the evaluation of the devitrification properties was "⊚", this is indicated by "⊚"when on the evaluation of heat resistance, crystallinity and meltability were all "○" and the evaluation of the devitrification properties was "○", this is indicated by "○"; and when at least one of the heat resistance and the devitrification properties was evaluated by "Δ", the overall evaluation is indicated by "Δ"

Examples 1–8 and Comparative Examples 1–4

The main components, the nucleating agent and the modification component described in Table 3 were mixed at the ratio as described in Table 3 to prepare a glass raw material. This glass raw material was molten to make a glass, and the resulting glass was subjected to a heat treatment (crystallizing treatment) at 875° C. or 900° C. for 4 hours to obtain the crystallized glasses of Examples 1–8 and Comparative Examples 1–4. The heat resistance, crystallinity and meltability of these crystallized glasses were evaluated and the results are shown in Table 4.

TABLE 3

| | | Main component | | | Modification component | | | Total of |
|---|---|---|---|---|---|---|---|---|
| | Mark in FIG. 1 | Total of components (Part by mass) | Nucleating agent $ZrO_2$ (Part by mass) | Glass clarifier $Sb_2O_3$ (Part by mass) | $P_2O_5$ (Part by mass) | $B_2O_3$ (Part by mass) | Total of 6 components (Part by mass) | crystallized glass (Part by mass) |
| Exam. 1 | (I) | 100 | 5 | 0.5 | 1 | — | 1 | 106.5 |
| Exam. 2 | (I) | 100 | 5 | 0.5 | 3 | — | 3 | 108.5 |
| Compar. Exam. 1 | (I) | 100 | 5 | 0.5 | — | 1 | — | 106.5 |
| Compar. Exam. 2 | (I) | 100 | 5 | 0.5 | — | 3 | — | 108.5 |
| Exam. 3 | (I) | 100 | 5 | 0.5 | 1 | 1 | 1 | 107.5 |
| Exam. 4 | (I) | 100 | 5 | 0.5 | 2 | 2 | 2 | 109.5 |
| Compar. Exam. 3 | (II) | 100 | 4 | 0.5 | — | — | — | 104.5 |
| Exam. 5 | (II) | 100 | 4 | 0.5 | 1 | — | 1 | 105.5 |
| Exam. 6 | (II) | 100 | 4 | 0.5 | 2 | — | 2 | 106.5 |
| Compar. Exam. 4 | (II) | 100 | 3 | 0.5 | — | — | — | 103.5 |
| Exam. 7 | (II) | 100 | 3 | 0.5 | 1 | — | 1 | 104.5 |
| Exam. 8 | (II) | 100 | 3 | 0.5 | 2 | — | 2 | 105.5 |

TABLE 4

| | Crystallizing temp. 875° C. Average linear thermal expansion coefficient × $10^{-7}$ (/° C.) | | | Crystallizing temp. 900° C. Average linear thermal expansion coefficient × $10^{-7}$ (/° C.) | | | Evaluation | | | |
|---|---|---|---|---|---|---|---|---|---|---|
| | 40–400° C. | 40–600° C. | 40–800° C. | 40–400° C. | 40–600° C. | 40–800° C. | Heat resistance | Crystallinity | Meltability | Overall evaluation |
| Exam. 1 | — | — | — | 1.5 | 2.4 | 3.9 | ○ | Δ | Δ | Δ |
| Exam. 2 | 28.4 | uncalculable | — | — | — | — | Δ | Δ | Δ | Δ |
| Compar. Exam. 1 | 33.3 | 35.9 | 38.7 | — | — | — | Δ | Δ | X | X |
| Compar. Exam. 2 | 45.1 | 46.3 | 47.5 | — | — | — | X | Δ | X | X |
| Exam. 3 | 31.3 | uncalculable | — | — | — | — | Δ | Δ | Δ | Δ |
| Exam. 4 | 44.9 | | 44.5 | — | — | — | Δ | Δ | Δ | Δ |
| Compar. Exam. 3 | −5.7 | −2.7 | — | −7.1 | −3.0 | −0.1 | ○ | ○ | X | X |
| Exam. 5 | 5.4 | 8.4 | — | 6.2 | 9.0 | — | ○ | ○ | Δ | ○ |
| Exam. 6 | 27.5 | 29.2 | — | 28.3 | 29.0 | — | Δ | X | Δ | Δ |
| Compar. Exam. 4 | — | — | — | 9.5 | 9.2 | — | ○ | Δ | X | X |
| Exam. 7 | 27.1 | 28.9 | — | — | — | — | Δ | Δ | Δ | Δ |
| Exam. 8 | 25.3 | 27.7 | — | 27.8 | 28.4 | — | Δ | X | Δ | Δ |

In Column of average linear thermal expansion coefficient, "uncalculable" shows that the calculation was impossible due to the presence of transition point and yielding point on thermal expansion curve.

Evaluation

As shown in Table 3 and Table 4, the crystallized glasses of Examples 1–8 containing diphosphorus pentoxide as a modification component were superior in meltability compared to those of Comparative Examples 1–4 which contained no diphosphorus pentoxide as a modification component. Particularly, the crystallized glass of Example 5 which did not contain boron oxide and contained only 1 part by mass of diphosphorus pentoxide as a modification component, was superior in both heat resistance and crystallinity and thus showed even better results. On the other hand, the crystallized glass of Comparative Example 2 containing boron oxide as a modification component in a relatively large amount, namely, 3 parts by mass, was inferior in both heat resistance and meltability.

Examples 9–19

The main components, the nucleating agent and the modification component described in Table 5 were mixed at the ratios described in Table 5 to prepare a glass raw material. This glass raw material was molten to make a glass, and the resulting glass was subjected to a heat treatment (crystallizing treatment) at 825° C., 850° C., 875° C. or 900° C. for 4 hours to obtain crystallized glasses of Examples 9–19. The heat resistance, crystallinity and meltability of these crystallized glasses were evaluated and the results are shown in Table 6.

TABLE 5

| | Main component | Nucleating agent ZrO$_2$ (Part by mass) | Glass clarifier Sb$_2$O$_3$ (Part by mass) | Modification component | | | | | | Total of crystallized glass (Part by mass) |
|---|---|---|---|---|---|---|---|---|---|---|
| | Mark in FIG. 1 | Total of components (Part by mass) | | | P$_2$O$_5$ (Part by mass) | Li$_2$O (Part by mass) | Na$_2$O (Part by mass) | K$_2$O (Part by mass) | Cs$_2$O (Part by mass) | Total of 6 components (Part by mass) | |
| Exam. 9 | (VII) | 100 | 5 | 0.5 | — | 0.5 | — | — | — | 0.5 | 106.0 |
| Exam. 10 | (VII) | 100 | 5 | 0.5 | — | — | 0.5 | — | — | 0.5 | 106.0 |
| Exam. 11 | (I) | 100 | 5 | 0.5 | — | 0.5 | — | — | — | 0.5 | 106.0 |
| Exam. 12 | (I) | 100 | 5 | 0.5 | — | — | 0.5 | — | — | 0.5 | 106.0 |
| Exam. 13 | (I) | 100 | 5 | 0.5 | — | — | — | 0.5 | — | 0.5 | 106.0 |
| Exam. 14 | (I) | 100 | 5 | 0.5 | — | — | — | — | 0.5 | 0.5 | 106.0 |
| Exam. 15 | (I) | 100 | 5 | 0.5 | — | 0.3 | 0.4 | 0.6 | — | 1.3 | 106.8 |
| Exam. 16 | (I) | 100 | 5 | 0.5 | 1 | 0.3 | 0.4 | 0.6 | — | 2.3 | 107.8 |
| Exam. 17 | (I) | 100 | 5 | 0.5 | 1 | 0.45 | 0.6 | 0.9 | — | 2.95 | 108.45 |
| Exam. 18 | (I) | 100 | 5 | 0.5 | 1 | 0.6 | 0.8 | 1.2 | — | 3.6 | 109.1 |
| Exam. 19 | (I) | 100 | 5 | 0.5 | 1 | 0.75 | 1 | 1.5 | — | 4.25 | 109.75 |

TABLE 6

| | Crystallizing temp. 850° C. Average linear thermal expansion coefficient × 10$^{-7}$ (/° C.) | | | Crystallizing temp. 875° C. Average linear thermal expansion coefficient × 10$^{-7}$ (/° C.) | | | Crystallizing temp. 900° C. Average linear thermal expansion coefficient × 10$^{-7}$ (/° C.) | | |
|---|---|---|---|---|---|---|---|---|---|
| | 40–400° C. | 40–600° C. | 40–800° C. | 40–400° C. | 40–600° C. | 40–800° C. | 40–400° C. | 40–600° C. | 40–800° C. |
| Exam. 9 | — | — | — | −18.2 | — | — | −12.3 | −12.5 | −11.1 |
| Exam. 10 | — | — | — | — | — | — | 4.5 | 4.6 | 5.1 |
| Exam. 11 | −5.4 | −4.8 | −4.6 | −4.2 | −4.0 | −3.9 | 5.1 | 3.5 | — |
| Exam. 12 | 22.3 | uncalculable | — | 6.3 | 5.8 | 6.1 | 28.4 | 26.5 | — |
| Exam. 13 | 29.2 | uncalculable | — | 7.9 | 8.1 | — | 24.1 | 24.7 | — |
| Exam. 14 | 19.6 | incalculable | — | −2.7 | −0.9 | 0.5 | −2.9 | −2.0 | — |
| Exam. 15 | 24.8 | uncalculable | — | 4.1 | 4.9 | 7.1 | 2.6 | 3.4 | 5.0 |
| Exam. 16 | 25.0 | uncalculable | — | 7.6 | 8.0 | 10.1 | 5.4 | 5.7 | 6.6 |
| Exam. 17 | 19.3 | 21.1 | 28.0 | 11.5 | 12.3 | 19.1 | — | — | — |
| Exam. 18 | 15.5 | 16.9 | 23.6 | 9.9 | 11.6 | 17.5 | — | — | — |
| Exam. 19 | 16.8 | 18.4 | 27.2 | 15.6 | 16.5 | 24.5 | — | — | — |

| | Evaluation | | | |
|---|---|---|---|---|
| | Heat resistance | Crystallinity | Meltability | Overall evaluation |
| Exam. 9 | ○ | △ | △ | △ |
| Exam. 10 | ○ | △ | △ | △ |
| Exam. 11 | ○ | ○ | △ | ○ |
| Exam. 12 | ○ | △ | △ | △ |
| Exam. 13 | ○ | △ | △ | △ |
| Exam. 14 | ○ | ○ | △ | ○ |
| Exam. 15 | ○ | ○ | △ | ○ |
| Exam. 16 | ○ | ○ | △ | ○ |
| Exam. 17 | ○ | ○ | ○ | ◎ |
| Exam. 18 | ○ | ○ | ○ | ◎ |
| Exam. 19 | ○ | ○ | ○ | ◎ |

In Column of average linear thermal expansion coefficient, "uncalculable" shows that the calculation was impossible due to the presence of transition point and yielding point on thermal expansion curve.

Evaluation

As shown in Table 5 and Table 6, the crystallized glass of Example 11 having a main component constitutional ratio indicated by mark (I) in FIG. 1 was superior in crystallinity to the crystallized glass of Example 9 having a main component constitutional ratio indicated by mark (VII) in FIG. 1. Among the crystallized glasses of Examples 11–19 having a main component constitutional ratio indicated by mark (I) in FIG. 1, those of Examples 11, 14, 15 and 16 containing lithium oxide or cesium oxide as a modification component were superior in crystallinity to those of Examples 12 and 13 containing only sodium oxide or potassium oxide. Furthermore, the crystallized glasses of Examples 17–19, in which the total amount of the modification components (6 components) specified in the present invention exceeded 2.5 parts by mass, were additionally superior in meltability and showed markedly good results.

Comparative Examples 5–10

The main components, the nucleating agent and the modification component described in Table 7 were mixed at the ratios described in Table 7 to prepare a glass raw material. This glass raw material was molten to make a glass, and the resulting glass was subjected to a heat treatment crystallizing treatment) at 875° C. or 900° C. for 4 hours to obtain crystallized glasses of Comparative Examples 5–10. The heat resistance, crystallinity and meltability of these crystallized glasses were evaluated and the results are shown in Table 8.

oxide or yttrium oxide as a modification component in place of the modification components (6 components) specified in the present invention, were inferior in meltability.

Examples 20–29

The main components, the nucleating agent and the modification component described in Table 9 were mixed at the ratios described in Table 9 to prepare a glass raw material. This glass raw material was molten to make a glass, and the resulting glass was subjected to a heat treatment (crystallizing treatment) at 800° C., 825° C. or 850° C. for 4 hours to obtain crystallized glasses of Examples 20–29. The heat resistance, crystallinity and meltability of these crystallized glasses were evaluated and the results are shown in Table 10.

TABLE 7

| | | Main Component | | | Modification component | | | | | | | |
| | Mark in FIG. 1 | Total of main components (Part by mass) | Nucleating agent $ZrO_2$ (Part by mass) | Glass clarifier $Sb_2O_3$ (Part by mass) | $Bi_2O_3$ (Part by mass) | CaO (Part by mass) | SrO (Part by mass) | MgO (Part by mass) | BaO (Part by mass) | $Y_2O_3$ (Part by mass) | Total of 6 components (Part by mass) | Total of crysallized glass (Part by mass) |
|---|---|---|---|---|---|---|---|---|---|---|---|---|
| Compar. Exam. 5 | (VII) | 100 | 5 | 0.5 | 2 | — | — | — | — | — | — | 107.5 |
| Compar. Exam. 6 | (VII) | 100 | 5 | 0.5 | — | 2 | — | — | — | — | — | 107.5 |
| Compar. Exam. 7 | (VII) | 100 | 5 | 0.5 | — | — | 2 | — | — | — | — | 107.5 |
| Compar. Exam. 8 | (VII) | 100 | 5 | 0.5 | — | — | — | 2 | — | — | — | 107.5 |
| Compar. Exam. 9 | (VII) | 100 | 5 | 0.5 | — | — | — | — | 2 | — | — | 107.5 |
| Compar. Exam. 10 | (VII) | 100 | 5 | 0.5 | — | — | — | — | — | 2 | — | 107.5 |

TABLE 8

| | Crystallizing temp. 875° C. Average linear thermal expansion coefficient × $10^{-7}$ (/° C.) | | | Crystallizing temp. 900° C. Average linear thermal expansion coefficient × $10^{-7}$ (/° C.) | | | Evaluation | | | |
| | 40–400° C. | 40–600° C. | 40–800° C. | 40–400° C. | 40–600° C. | 40–800° C. | Heat resistance | Crystallinity | Meltability | Overall evaluation |
|---|---|---|---|---|---|---|---|---|---|---|
| Compar. Exam. 5 | 32.8 | 35.6 | — | 50.5 | 50.6 | — | Δ | Δ | X | X |
| Compar. Exam. 6 | 33.3 | 36.4 | — | 27.5 | 26.9 | — | Δ | X | X | X |
| Compar. Exam. 7 | 31.6 | 34.3 | — | — | — | — | Δ | X | X | X |
| Compar. Exam. 8 | 32.6 | 35.6 | — | — | — | — | Δ | X | X | X |
| Compar. Exam. 9 | 30.1 | 33.1 | — | — | — | — | Δ | X | X | X |
| Compar. Exam. 10 | 31.9 | 34.6 | — | 38.4 | 41.3 | 44.4 | Δ | Δ | X | X |

Evaluation

As shown in Table 7 and Table 8, the crystallized glasses of Comparative Examples 5–10, containing bismuth oxide, calcium oxide, strontium oxide, magnesium oxide, barium

TABLE 9

| | | Main component | | | Modification component | | | | | | | | | |
| | Mark in FIG. 1 | Total of main components (Part by mass) | Nucleating agent $ZrO_2$ (Part by mass) | Glass clarifier $Sb_2O_3$ (Part by mass) | $P_2O_5$ (Part by mass) | $V_2O_5$ (Part by mass) | $Nb_2O_5$ (Part by mass) | $Ta_2O_5$ (Part by mass) | $MoO_3$ (Part by mass) | $Li_2O$ (Part by mass) | $Na_2O$ (Part by mass) | $K_2O$ (Part by mass) | Total of 6 components (Part by mass) | Total of crystallized glass (Part by mass) |
|---|---|---|---|---|---|---|---|---|---|---|---|---|---|---|
| Exam. 20 | (I) | 100 | 5 | 0.5 | 1 | 0.2 | — | — | — | 0.6 | 0.8 | 1.2 | 3.6 | 109.3 |
| Exam. 21 | (I) | 100 | 5 | 0.5 | 1 | — | 0.2 | — | — | 0.6 | 0.8 | 1.2 | 3.8 | 109.3 |

TABLE 9-continued

| | Main component | | | Modification component | | | | | | | | | |
|---|---|---|---|---|---|---|---|---|---|---|---|---|---|
| Mark in FIG. 1 | Total of main components (Part by mass) | Nucleating agent $ZrO_2$ (Part by mass) | Glass clarifier $Sb_2O_3$ (Part by mass) | $P_2O_5$ (Part by mass) | $V_2O_5$ (Part by mass) | $Nb_2O_5$ (Part by mass) | $Ta_2O_5$ (Part by mass) | $MoO_3$ (Part by mass) | $Li_2O$ (Part by mass) | $Na_2O$ (Part by mass) | $K_2O$ (Part by mass) | Total of 6 components (Part by mass) | Total of crystallized glass (Part by mass) |
| Exam. 22 | (I) | 100 | 5 | 0.5 | 1 | — | — | 0.2 | — | 0.6 | 0.8 | 1.2 | 3.8 | 109.3 |
| Exam. 23 | (I) | 100 | 5 | 0.5 | 1 | — | — | — | 0.2 | 0.6 | 0.8 | 1.2 | 3.6 | 109.3 |
| Exam. 24 | (I) | 100 | 4 | 0.5 | 1 | — | 0.3 | — | — | 0.6 | 0.8 | 1.2 | 3.9 | 108.4 |
| Exam. 25 | (I) | 100 | 4 | 0.5 | 1 | — | 0.5 | — | — | 0.6 | 0.8 | 1.2 | 4.1 | 108.6 |
| Exam. 26 | (I) | 100 | 3 | 0.5 | 1 | — | 0.5 | — | — | 0.6 | 0.8 | 1.2 | 4.1 | 107.6 |
| Exam. 27 | (I) | 100 | 4 | 0.5 | 1 | — | — | 0.1 | — | 0.6 | 0.8 | 1.2 | 3.7 | 108.2 |
| Exam. 28 | (I) | 100 | 4 | 0.5 | 1 | — | — | 0.3 | — | 0.6 | 0.8 | 1.2 | 3.9 | 108.4 |
| Exam. 29 | (I) | 100 | 4 | 0.5 | 1 | — | — | 0.5 | — | 0.6 | 0.8 | 1.2 | 4.1 | 108.6 |

TABLE 10

| | Crystallizing temp. 800° C. average linear thermal expansion coefficient × $10^{-7}$ (/° C.) | | | Crystallizing temp. 825° C. average linear thermal expansion coefficient × $10^{-7}$ (/° C.) | | | Crystallizing temp. 850° C. average linear thermal expansion coefficient × $10^{-7}$ (/° C.) | | |
|---|---|---|---|---|---|---|---|---|---|
| | 40–400° C. | 40–600° C. | 40–800° C. | 40–400° C. | 40–600° C. | 40–800° C. | 40–400° C. | 40–600° C. | 40–800° C. |
| Exam. 20 | 36.6 | uncalculable | — | 15.3 | 16.8 | 25.1 | — | — | — |
| Exam. 21 | 18.2 | 19.8 | 22.7 | 12.6 | 13.2 | 19.5 | — | — | — |
| Exam. 22 | 30.2 | uncalculable | — | 14.0 | 15.3 | 21.8 | — | — | — |
| Exam. 23 | 35.0 | uncalculable | — | 16.6 | 18.1 | 26.9 | — | — | — |
| Exam. 24 | — | — | — | 15.7 | 16.3 | 25.1 | 15.1 | 15.7 | 24.3 |
| Exam. 25 | — | — | — | 14.7 | 15.4 | 22.8 | 14.1 | 15.5 | 21.3 |
| Exam. 26 | — | — | — | 29.7 | uncalculable | — | 10.6 | 12.2 | — |
| Exam. 27 | — | — | — | — | — | — | 14.8 | 16.3 | 23.8 |
| Exam. 28 | — | — | — | 13.5 | 14.6 | — | 13.9 | 14.6 | 21.7 |
| Exam. 29 | — | — | — | 12.5 | 13.0 | 19.8 | 13.0 | 14.4 | 19.8 |

| | Evaluation | | | |
|---|---|---|---|---|
| | Heat resistance | Crystallinity | Meltability | Overall evaluation |
| Exam. 20 | ○ | Δ | ○ | ○ |
| Exam. 21 | ○ | ○ | ○ | ⊚ |
| Exam. 22 | ○ | Δ | ○ | ○ |
| Exam. 23 | ○ | Δ | ○ | ○ |
| Exam. 24 | ○ | ○ | ○ | ⊚ |
| Exam. 25 | ○ | ○ | ○ | ⊚ |
| Exam. 26 | ○ | ○ | ○ | ⊚ |
| Exam. 27 | ○ | ○ | ○ | ⊚ |
| Exam. 28 | ○ | ○ | ○ | ⊚ |
| Exam. 29 | ○ | ○ | ○ | ⊚ |

In Column of average linear thermal expansion coefficient, "uncalculable" shows that the calculation was impossible due to the presence of transition point and yielding point on thermal expansion curve.

Example 30–43

The main components, the nucleating agent and the modification component described in Table 11 were mixed at the ratios described in Table 11 to prepare a glass raw material. This glass raw material was molten to make a glass, and the resulting glass was subjected to a heat treatment (crystallizing treatment) at 825° C. or 850° C. for 4 hours to obtain crystallized glasses of Examples 30–43. The heat resistance, crystallinity and meltability of these crystallized glasses were evaluated and the results are shown in Table 12.

TABLE 11

| | Main Component | | | Modification component | | | | | | | Total of crystallized glass (Part by mass) |
|---|---|---|---|---|---|---|---|---|---|---|---|
| Mark in FIG. 1 | Total of main components (Part by mass) | Nucleating agent ZrO$_2$ (Part by mass) | Glass clarifier Sb$_2$O$_3$ (Part by mass) | P$_2$O$_5$ (Part by mass) | Nb$_2$O$_5$ (Part by mass) | Ta$_2$O$_5$ (Part by mass) | Li$_2$O (Part by mass) | Na$_2$O (Part by mass) | K$_2$O (Part by mass) | Total of 6 components (Part by mass) | |
| Exam. 30 | (I) | 100 | 4 | 0.5 | 1 | 0.1 | 0.1 | 0.6 | 0.8 | 1.2 | 3.8 | 108.3 |
| Exam. 31 | (I) | 100 | 4 | 0.5 | 1 | 0.3 | 0.3 | 0.6 | 0.8 | 1.2 | 4.2 | 108.7 |
| Exam. 32 | (I) | 100 | 4 | 0.5 | 1 | 0.5 | 0.5 | 0.6 | 0.8 | 1.2 | 4.6 | 109.1 |
| Exam. 33 | (I) | 100 | 5 | 0.5 | 1 | 0.1 | 0.1 | 0.6 | 0.8 | 1.2 | 3.8 | 109.3 |
| Exam. 34 | (I) | 100 | 5 | 0.5 | 1 | 0.2 | 0.2 | 0.6 | 0.8 | 1.2 | 4.0 | 109.5 |
| Exam. 35 | (I) | 100 | 5 | 0.5 | 1 | 0.3 | 0.3 | 0.6 | 0.8 | 1.2 | 4.2 | 109.7 |
| Exam. 36 | (I) | 100 | 5 | 0.5 | 1 | 0.5 | 0.5 | 0.6 | 0.8 | 1.2 | 4.6 | 110.1 |
| Exam. 37 | (I) | 100 | 5 | 0.5 | 1 | 0.1 | 0.1 | 0.45 | 0.6 | 0.9 | 3.15 | 108.7 |
| Exam. 38 | (I) | 100 | 5 | 0.5 | 1 | 0.2 | 0.2 | 0.45 | 0.6 | 0.9 | 3.35 | 108.9 |
| Exam. 39 | (I) | 100 | 5 | 0.5 | 1 | 0.3 | 0.3 | 0.45 | 0.6 | 0.9 | 3.55 | 109.1 |
| Exam. 40 | (I) | 100 | 5 | 0.5 | 1 | 0.5 | 0.5 | 0.45 | 0.6 | 0.9 | 3.95 | 109.5 |
| Exam. 41 | (I) | 100 | 4.5 | 0.5 | 1 | 0.1 | 0.1 | 0.6 | 0.7 | 1 | 3.5 | 108.5 |
| Exam. 42 | (I) | 100 | 4.5 | 0.5 | 1 | 0.3 | 0.2 | 0.6 | 0.7 | 1 | 3.8 | 108.8 |
| Exam. 43 | (I) | 100 | 4.5 | 0.5 | 1 | 0.5 | 0.5 | 0.6 | 0.7 | 1 | 4.3 | 109.3 |

TABLE 12

| | Crystallizing temp. 825° C. Average linear thermal expansion coefficient × 10$^{-7}$ (/° C.) | | | Crystallizing temp. 850° C. Average linear thermal expansion coefficient × 10$^{-7}$ (/° C.) | | | Evaluation | | | |
|---|---|---|---|---|---|---|---|---|---|---|
| | 40–400° C. | 40–600° C. | 40–800° C. | 40–400° C. | 40–600° C. | 40–800° C. | Heat resistance | Crystallinity | Meltability | Overall evaluation |
| Exam. 30 | 12.9 | 13.8 | — | 12.0 | 12.9 | — | ○ | ○ | ○ | ◎ |
| Exam. 31 | 14.0 | 15.7 | 23.2 | 12.6 | 13.2 | 20.7 | ○ | ○ | ○ | ◎ |
| Exam. 32 | 13.8 | 15.4 | 22.6 | 13.1 | 14.6 | 20.9 | ○ | ○ | ○ | ◎ |
| Exam. 33 | 12.3 | 13.5 | 18.8 | 13.3 | 14.6 | 19.2 | ○ | ○ | ○ | ◎ |
| Exam. 34 | 12.6 | 13.2 | 18.6 | 10.8 | 10.9 | — | ○ | ○ | ○ | ◎ |
| Exam. 35 | 12.9 | 14.1 | 18.8 | 11.3 | 12.3 | 16.1 | ○ | ○ | ○ | ◎ |
| Exam. 36 | 9.9 | 10.5 | 15.0 | 11.4 | 11.7 | 15.1 | ○ | ○ | ○ | ◎ |
| Exam. 37 | — | — | — | 7.8 | 7.9 | 11.4 | ○ | ○ | ○ | ◎ |
| Exam. 38 | — | — | — | 7.8 | 8.4 | — | ○ | ○ | ○ | ◎ |
| Exam. 39 | — | — | — | 8.3 | 9.2 | 12.1 | ○ | ○ | ○ | ◎ |
| Exam. 40 | — | — | — | 8.4 | 9.4 | 12.5 | ○ | ○ | ○ | ◎ |
| Exam. 41 | — | — | — | 10.4 | 10.5 | — | ○ | ○ | ○ | ◎ |
| Exam. 42 | — | — | — | 9.6 | 10.6 | 13.9 | ○ | ○ | ○ | ◎ |
| Exam. 43 | — | — | — | 10 | 11.2 | 14.6 | ○ | ○ | ○ | ◎ |

Evaluation

As shown in Table 9–Table 12, the crystallized glasses of Examples 21 and 24–43 containing niobium oxide or tantalum oxide in addition to alkali metal oxides as modification components, showed superior results with respect to all of the heat resistance, crystallinity and meltability characteristics that were evaluated, and showed very good results. Furthermore, the crystallized glasses of Examples 20 and 23, containing vanadium oxide or molybdenum oxide in addition to alkali metal oxides as modification components, also showed good results, but were somewhat inferior in crystallinity compared with the crystallized glasses of Examples 21 and 24–43, which showed very good results.

Examples 44–50 and Comparative Examples 11–13

The main components, the nucleating agent and the modification component described in Table 13 were mixed at the ratio as described in Table 13 to prepare a glass raw material. This glass raw material was molten to make a glass, and the resulting glass was subjected to a heat treatment (crystallizing treatment) at 800° C. or 825° C. for 4 hours to obtain crystallized glasses of Examples 44–50 and Comparative Examples 11–13. The heat resistance, crystallinity, meltability and devitrification properties of these crystallized glasses were evaluated and the results are shown in Table 14.

TABLE 13

| | Mark in FIG. 1 | Main component Total of main components (Part by mass) | Nucleating agent ZrO$_2$ (Part by mass) | Nucleating agent SnO$_2$ (Part by mass) | Glass clarifier Sb$_2$O$_3$ (Part by mass) | Modification component P$_2$O$_5$ (Part by mass) | Nb$_2$O$_5$ (Part by mass) | Ta$_2$O$_5$ (Part by mass) | Li$_2$O (Part by mass) | Na$_2$O (Part by mass) | K$_2$O (Part by mass) | Total of 6 components (Part by mass) | Total of crystallized glass (Part by mass) |
|---|---|---|---|---|---|---|---|---|---|---|---|---|---|
| Exam. 44 | (I) | 100 | 4 | — | 0.5 | 1 | 0.3 | 0.2 | 0.6 | 0.9 | 1.2 | 4.2 | 108.7 |
| Exam. 45 | (I) | 100 | 4 | 0.5 | 0.5 | 1 | 0.3 | 0.2 | 0.6 | 0.9 | 1.2 | 4.2 | 109.2 |
| Exam. 46 | (I) | 100 | 4 | 1 | 0.5 | 1 | 0.3 | 0.2 | 0.6 | 0.9 | 1.2 | 4.2 | 109.7 |
| Exam. 47 | (I) | 100 | 4 | 1.5 | 0.5 | 1 | 0.3 | 0.2 | 0.6 | 0.9 | 1.2 | 4.2 | 110.2 |
| Exam. 48 | (I) | 100 | 4 | 2 | 0.5 | 1 | 0.3 | 0.2 | 0.6 | 0.9 | 1.2 | 4.2 | 110.7 |
| Exam. 49 | (I) | 100 | 3 | 1.5 | 0.5 | 1 | 0.3 | 0.2 | 0.6 | 0.9 | 1.2 | 4.2 | 109.2 |
| Exam. 50 | (I) | 100 | 3 | 2 | 0.5 | 1 | 0.3 | 0.2 | 0.6 | 0.9 | 1.2 | 4.2 | 109.7 |
| Compar. Exam. 11 | (I) | 100 | — | 4 | 0.5 | 1 | 0.3 | 0.2 | 0.6 | 0.9 | 1.2 | 4.2 | 108.7 |
| Compar. Exam. 12 | (I) | 100 | — | 5 | 0.5 | 1 | 0.3 | 0.2 | 0.6 | 0.9 | 1.2 | 4.2 | 109.7 |
| Compar. Exam. 13 | (I) | 100 | — | 6 | 0.5 | 1 | 0.3 | 0.2 | 0.6 | 0.9 | 1.2 | 4.2 | 110.7 |

TABLE 14

| | Crystallizing temp. 800° C. | | | | Crystallizing temp. 825° C. | | | |
|---|---|---|---|---|---|---|---|---|
| | Average linear thermal expansion coefficient × 10$^{-7}$ (/° C.) | | | Crystalline phase | Average linear thermal expansion coefficient × 10$^{-7}$ (/° C.) | | | Crystalline phase |
| | 40–400° C. | 40–600° C. | 40–800° C. | | 40–400° C. | 40–600° C. | 40–800° C. | |
| Exam. 44 | 17.2 | 18.6 | 28.4 | Qu | 15.4 | 16.3 | 22.3 | Qu |
| Exam. 45 | — | — | — | — | 13.3 | 14.8 | 21.6 | — |
| Exam. 46 | — | — | — | — | 16.1 | 18.6 | 24.8 | — |
| Exam. 47 | — | — | — | — | 15.0 | 16.9 | 22.9 | — |
| Exam. 48 | — | — | — | — | 13.8 | 16.1 | 21.8 | — |
| Exam. 49 | — | — | — | — | 17.6 | 20.5 | 27.7 | — |
| Exam. 50 | 9.9 | 10.5 | 15.0 | — | 14.5 | 17.0 | 22.3 | Pe(Qu) |
| Compar. Exam. 11 | 34.9 | 39.0 | uncalculable | — | 7.8 | 7.9 | 11.4 | Qu(Ga, Wi) |
| Compar. Exam. 12 | 32.5 | 34.7 | 43.7 | — | 34.8 | 36.4 | 41.8 | Qu(Ga, Wi) |
| Compar. Exam. 13 | 36.4 | 38.7 | — | — | 33.6 | 35.0 | — | Qu(Ga, Wi) |

| | Evaluation | | | | |
|---|---|---|---|---|---|
| | Heat resistance | Crystallinity | Meltability | devitrification properties | Overall evaluation |
| Exam. 44 | ○ | ○ | ○ | Δ | Δ |
| Exam. 45 | ○ | ○ | ○ | Δ | Δ |
| Exam. 46 | ○ | ○ | ○ | Δ | Δ |
| Exam. 47 | ○ | ○ | ○ | Δ | Δ |
| Exam. 48 | ○ | ○ | ○ | Δ | Δ |
| Exam. 49 | ○ | ○ | ○ | ○ | ○ |
| Exam. 50 | ○ | ○ | ○ | ⊙ | ⊙ |
| Compar. Exam. 11 | ○ | ○ | ○ | ⊙ | ⊙ |
| Compar. Exam. 12 | Δ | ○ | ○ | ⊙ | Δ |
| Compar. Exam. 13 | Δ | ○ | ○ | Δ | Δ |

In Column of crystalline phase, the bold letters means main crystalline phase and letters in parentheses indicate other crystalline phases, and Qu: β-quartz solid solution, Pe: zinc-petallite solid solution, Wi: willemite, and Ga: gahnite.
In Column of average linear thermal expansion coefficient, "uncalculable" shows that the calculation was impossible due to the presence of transition point and yielding point on thermal expansion curve.

Evaluation

As shown in Table 13–Table 14, the crystallized glass of Example 44, containing only 4 parts by mass of zirconia as a nucleating agent, showed superior results with respect to all of the characteristics of heat resistance, crystallinity and meltability that were measured, and showed very good results like the crystallized glasses of Examples 17–19, 21 and 24–43. When devitrification properties were examined, however, devitrification phenomenon caused by recrystallization of zirconia as a nucleating agent was seen in a part of the samples.

The crystallized glasses of Examples 45–48, which corresponded to the crystallized glass of Example 44 to which merely tin dioxide was added as a nucleating agent without changing the content of zirconia, did not show improved devitrification properties.

On the other hand, the crystallized glass of Example 49, in which the content of zirconia as the nucleating agent was reduced to 3 parts by mass and instead 1.5 parts by mass of tin dioxide as a nucleating agent was contained, showed improved devitrification properties and the crystallinity was not deteriorated. That is, in the case of the crystallized glass of Example 49, recrystallization of zirconia at the steps of melting and molding of the glass raw material could be inhibited while maintaining good crystallinity.

Furthermore, the crystallized glass of Example 50 in which the content of zirconia as a nucleating agent was reduced to 3 parts by mass and instead 2 parts by mass of tin dioxide as a nucleating agent was contained, showed markedly improved in devitrification properties and the crystallinity was not deteriorated. That is, in the case of the crystallized glass of Example 50, recrystallization of zirconia at the steps of melting and molding of the glass raw material could be inhibited while maintaining good crystallinity. Moreover, since its main crystalline phase was a zinc petallite solid solution, it had a low thermal expansion coefficient and excellent heat resistance that were comparable to that of lithia-based crystallized glass.

Furthermore, when tin dioxide as a nucleating agent was contained in place of all of the zirconia as a nucleating agent (namely, when only tin dioxide was included as a nucleating agent), the devitrification properties could be markedly improved while maintaining good crystallinity and heat resistance in some samples, as in the case of the crystallized glass of Comparative Example 11. But, in some cases, the thermal expansion coefficient of crystallized glass per se increased to deteriorate the heat resistance due to the formation of gahnite or willemite, as in the cases of the crystallized glasses of Comparative Examples 12 and 13.

Moreover, in the crystallized glass of Comparative Example 13, in which the content of tin dioxide was 6 parts by mass, the devitrification phenomenon occurred as in the case of zirconia because the tin dioxide per se was readily recrystallized.

Stability of Crystal with Lapse of Time

Apart from the evaluation of the heat resistance, crystallinity, meltability and devitrification properties mentioned above, of the crystal stability over time was evaluated Evaluation of the crystal stability over time was conducted in the following manner. Measurement samples of 3 mm×3 mm×20 mm were cut out from the crystallized glass, and were kept under high temperatures of 600° C., 650° C., 700° C. and 750° C. for 20 hours, and the change of volume expansion coefficient over time was measured in accordance with the method described in JIS R1618. The subjects evaluated were the crystallized glass of Example 50 and commercially available lithia-based crystallized glass of which main crystalline phases were β-spodumene solid solution and β-eucryptite solid solution (referred to as "Comparative Example 14"). The crystallized glass of Comparative Example 14 had the composition as described in Table 15. The results are shown in FIG. 2 and FIG. 3.

TABLE 15

| | Constitutional component ratio (100% by mass in total) | | | Crystallizing Temperature 900° C. | | | |
|---|---|---|---|---|---|---|---|
| | | | | Average linear thermal expansion coefficient × $10^{-7}$ (/° C.) | | | Crystalline |
| | Li$_2$O (% by mass) | Al$_2$O$_3$ (% by mass) | SiO$_2$ (% by mass) | 40–400° C. | 40–600° C. | 40–700° C. | phase |
| Comparative Example 14 | 6.0 | 32.0 | 62.0 | 17.0 | 24.0 | 34.0 | Eu, Sp |

In Column of crystalline phase, the bold letters means main crystalline phase, and Eu: β-eucryptite solid solution, and Sp: β-spodumene solid solution.

As can be seen from the graph of FIG. 2, the crystallized glass of Example 50 showed an increased expansion coefficient (expansion of volume) with an increase of temperature until the glass temperature reached the locking temperature, but maintained nearly a constant expansion coefficient (volume) after the glass temperature reached the locking temperature, which did not substantially change even after 20 hours. That is, the crystallized glass of Example 50 showed high stability over time under high temperature conditions and showed substantially no change in the contraction of volume even after being exposed to high temperature for a long time.

On the other hand, as shown in FIG. 3, after the crystallized glass of Comparative Example 14 reached the locking temperature and the expansion coefficient (volume) reached the maximum value, the crystallized glass showed a behavior of an abrupt decrease in the expansion coefficient (decrease of volume). This behavior had the tendency to become conspicuous with an increase of the locking temperature. That is, the crystallized glass of Comparative Example 14 showed a contraction of volume when it was exposed to high temperatures for a long time. Specifically, the crystallized glass of Example 50 showed a contraction of volume of 0% by volume after 20 hours at 750° C., while the crystallized glass of Comparative Example 14 showed a contraction of volume of 0.5% by volume.

INDUSTRIAL APPLICABILITY

The zinc oxide-alumina-silica-based crystallized glass of the present invention is suitably usable as a reflector substrate which constitutes a reflector for reflecting lights of light source lamps, particularly, as a reflector substrate of illuminators or projector light sources.

The invention claimed is:

1. A zinc oxide-alumina-silica-based crystallized glass comprising a main component comprising zinc oxide (ZnO), alumina ($Al_2O_3$) and silica ($SiO_2$);
   a nucleating agent comprising $ZrO_2$; and
   a modification component;
   wherein the main component comprises 20–30% by mass of zinc oxide, 15–25% by mass of alumina and 50–60% by mass of silica and amounts to 100% by mass in total;
   wherein the nucleating agent comprises 3–6 parts by mass of $ZrO_2$ based on 100 parts by mass of the main component; and
   wherein the modification component comprises at least one of niobium oxide ($Nb_2O_5$) and tantalum oxide ($Ta_2O_5$) in an amount of 0.1–0.05 parts by mass based on 100 parts by mass of the main component.

2. The zinc oxide-alumina-silica-based crystallized glass according to claim 1, wherein the main component comprises a crystalline phase including at least one of zinc petallite (Zn-petallite) solid solution and β-quartz solid solution as a main crystalline phase.

3. The zinc oxide-alumina-silica-based crystallized glass according to claim 1, wherein the modification component further comprises at least one component selected from the group consisting of lithium oxide, sodium oxide, potassium oxide and diphosphorus pentoxide so that the total amount of the modification component is in a range of 0.2–5.0 parts by mass based on 100 parts by mass of the main component.

4. The zinc oxide-alumina-silica-based crystallized glass according to claim 1, wherein the nucleating agent further comprises tin dioxide ($SnO_2$) in an amount of 0.5–4 parts by mass based on 100 parts by mass of the main component.

5. The zinc oxide-alumina-silica-based crystallized glass according to claim 2, wherein the modification component further comprises at least one component selected from the group consisting of lithium oxide, sodium oxide, potassium oxide, and diphosphorus pentoxide so that the total amount of the modification component is in a range of 0.2–5.0 parts by mass based on 100 parts by mass of the main component.

6. A reflector substrate comprising a zinc oxide-alumina-silica-based crystallized glass comprising a main component comprising zinc oxide (ZnO), alumina ($Al_2O_3$) and silica ($SiO_2$), a nucleating agent comprising zirconia ($ZrO_2$), and a modification component, wherein the main component comprises 20–30% by mass of zinc oxide, 15–25% by mass of alumina and 50–60% by mass of silica and wherein the main component amounts to 100% by mass in total, wherein the nucleating agent is provided in an amount of 3–6 parts by mass based on 100 parts by mass of the main component, and wherein the modification component comprises at least one component selected from the group consisting of lithium oxide ($Li_2O$), sodium oxide ($Na_2O$), potassium oxide ($K_2O$), diphosphorus pentoxide ($P_2O_5$), niobium oxide ($Nb_2O_5$) and tantalum oxide ($Ta_2O_5$);
   wherein the reflector substrate has a main body having a concave for disposing a reflective film therein and a metallic reticulate body embedded in the main body.

7. The reflector substrate according to claim 6, wherein the reticulate body comprises a metal having a main component comprising at least one metal selected from the group consisting of nickel (Ni), cobalt (Co), stainless steel and kobar.

8. The reflector substrate according to claim 6, wherein the reticulate body comprises a metal having a main component comprising at least one metal selected from the group consisting of gold (Au), platinum (Pt), silver (Ag) and copper (Cu) or has a surface film comprising the above metal.

9. The reflector substrate according to claim 7, wherein the reticulate body comprises a metal having a main component comprising at least one metal selected from the group consisting of gold (Au), platinum (Pt), silver (Ag) and copper (Cu) or has a surface film comprising the above metals.

* * * * *